(12) United States Patent
Ohta et al.

(10) Patent No.: US 8,701,011 B2
(45) Date of Patent: Apr. 15, 2014

(54) COMPUTER-READABLE STORAGE MEDIUM, APPARATUS, AND METHOD FOR SUPPORTING OPERATION SCREEN DESIGN

(75) Inventors: Yoshiyuki Ohta, Kawasaki (JP); Shun-ichi Hirabayashi, Kawasaki (JP); Akira Shikasho, Kawasaki (JP); Ryoji Suzuki, Kariya (JP); Kazuhiko Sugimoto, Kiyosu (JP)

(73) Assignees: Fujitsu Limited, Kawasaki (JP); Denso Corporation, Kariya (JP)

( * ) Notice: Subject to any disclaimer, the term of this patent is extended or adjusted under 35 U.S.C. 154(b) by 98 days.

(21) Appl. No.: 13/248,481

(22) Filed: Sep. 29, 2011

(65) Prior Publication Data
US 2012/0089929 A1   Apr. 12, 2012

(30) Foreign Application Priority Data

Oct. 7, 2010   (JP) .................................. 2010-227972

(51) Int. Cl.
*G06F 13/00*   (2006.01)
*G06F 15/00*   (2006.01)

(52) U.S. Cl.
USPC .......................................... 715/736; 715/734

(58) Field of Classification Search
USPC .......... 715/762–765, 751–753, 734, 736, 867
See application file for complete search history.

(56) References Cited

U.S. PATENT DOCUMENTS

| | | |
|---|---|---|
| 5,933,634 A | 8/1999 | Enokido et al. |
| 7,739,608 B2 * | 6/2010 | Fujishita ........................ 715/744 |
| 2002/0109721 A1 | 8/2002 | Konaka et al. |
| 2008/0320387 A1 * | 12/2008 | Sasaki et al. ................... 715/273 |

FOREIGN PATENT DOCUMENTS

| | | |
|---|---|---|
| JP | 7-56730 | 3/1995 |
| JP | 9-198240 | 7/1997 |
| JP | 9-237181 | 9/1997 |
| JP | 10-49355 | 2/1998 |
| JP | 10-154070 | 6/1998 |
| JP | 2000-99317 | 4/2000 |
| JP | 2000-347840 | 12/2000 |
| JP | 2005-165934 | 6/2005 |
| WO | WO 2006/110982 | 10/2006 |

OTHER PUBLICATIONS

European Search Report issued Dec. 6, 2013 for European Application No. 11183312.5.
Japanese Office Action issued Jan. 7, 2014 for corresponding Japanese Application No. 2010-227972.

* cited by examiner

Primary Examiner — Cao "Kevin" Nguyen
(74) Attorney, Agent, or Firm — Staas & Halsey LLP

(57) ABSTRACT

A UI specification creating apparatus displays a format that allows information relevant to a condition of an element displayed on an operation screen of a user interface to be activated and information concerning content of process that the element operates to be described in a given form and receives descriptions relevant to specifications of the element based on the format. The UI specification creating apparatus then displays the operation screen of the user interface and carries out a simulation of an operation of the element displayed on the operation screen of the user interface based on the information relevant to the condition of the element to be activated and the information concerning the content of process that the element operates received.

7 Claims, 23 Drawing Sheets

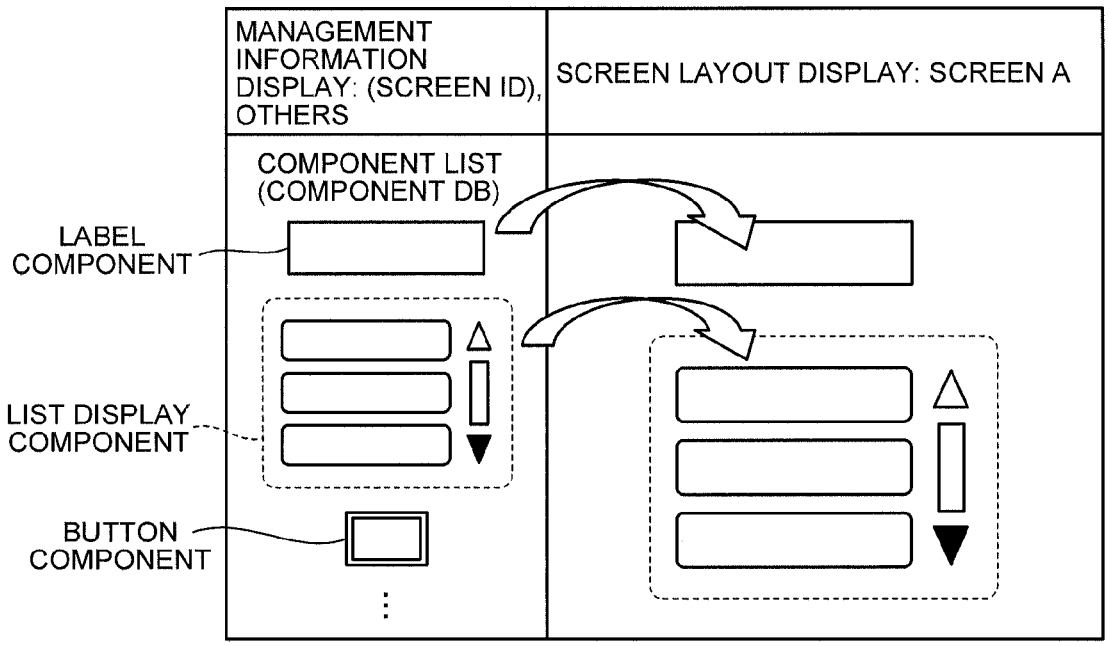

FIG.6

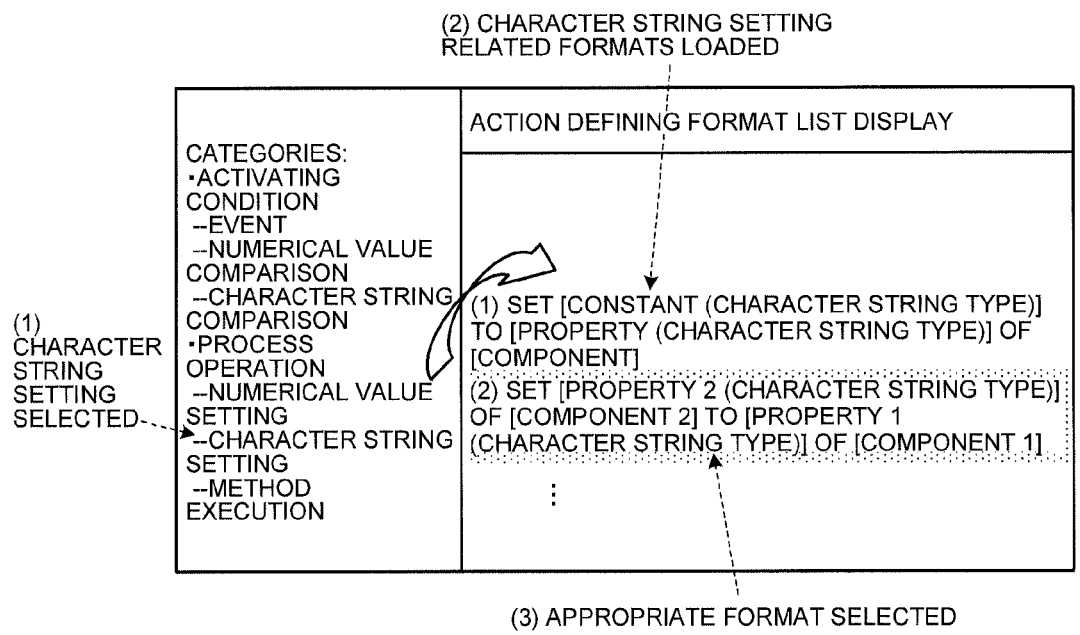

(1) CHARACTER STRING SETTING SELECTED

CATEGORIES:
•ACTIVATING CONDITION
  --EVENT
  --NUMERICAL VALUE COMPARISON
  --CHARACTER STRING COMPARISON
•PROCESS OPERATION
  --NUMERICAL VALUE SETTING
  --CHARACTER STRING SETTING
  --METHOD EXECUTION (2) CHARACTER STRING SETTING RELATED FORMATS LOADED

ACTION DEFINING FORMAT LIST DISPLAY (1) SET [CONSTANT (CHARACTER STRING TYPE)] TO [PROPERTY (CHARACTER STRING TYPE)] OF [COMPONENT]

(2) SET [PROPERTY 2 (CHARACTER STRING TYPE)] OF [COMPONENT 2] TO [PROPERTY 1 (CHARACTER STRING TYPE)] OF [COMPONENT 1]

(3) APPROPRIATE FORMAT SELECTED

FIG.7

| ON-SCREEN UI COMPONENT LIST | ATTRIBUTE NAME LIST |
|---|---|
| •LIST DISPLAY COMPONENT<br>•LABEL COMPONENT #1<br>•LABEL COMPONENT #2<br>•LABEL COMPONENT #3<br>•SCROLL COMPONENT #1<br>•SCROLL COMPONENT #2<br>•BAR CHART COMPONENT | BUTTON DISPLAY COLOR<br>BUTTON SHAPE<br>BUTTON HELD-DOWN EVENT |
| FUNCTIONAL COMPONENT LIST | |
| •SEARCH FUNCTION COMPONENT | |

FIG.8

| ON-SCREEN UI COMPONENT LIST | ATTRIBUTE NAME LIST |
|---|---|
| •LIST DISPLAY COMPONENT<br>•LABEL COMPONENT #1<br>•LABEL COMPONENT #2<br>•LABEL COMPONENT #3<br>•SCROLL COMPONENT #1<br>•SCROLL COMPONENT #2<br>•BAR CHART COMPONENT | LABEL #1 DISPLAY CHARACTER STRING<br>LABEL #2 DISPLAY CHARACTER STRING<br>: :<br>DISPLAY LIST TOP POINTER<br>DISPLAY LIST END POINTER<br>CURRENT DISPLAY POINTER<br>NUMBER OF DISPLAY DATA<br>: : |
| FUNCTIONAL COMPONENT LIST | |
| •SEARCH FUNCTION COMPONENT | |

FIG.9

| ON-SCREEN UI COMPONENT LIST | ATTRIBUTE NAME LIST |
|---|---|
| •LIST DISPLAY COMPONENT<br>•LABEL COMPONENT #1<br>•LABEL COMPONENT #2<br>•LABEL COMPONENT #3<br>•SCROLL COMPONENT #1<br>•SCROLL COMPONENT #2<br>•BAR CHART COMPONENT | LABEL #1 DISPLAY CHARACTER STRING<br>LABEL #2 DISPLAY CHARACTER STRING<br>: :<br>DISPLAY LIST TOP POINTER<br>DISPLAY LIST END POINTER<br>CURRENT DISPLAY POINTER<br>NUMBER OF DISPLAY DATA<br>: : |
| FUNCTIONAL COMPONENT LIST | |
| •SEARCH FUNCTION COMPONENT | |

(1) DISPLAY CONTENT OF LABEL #2 TO LABEL #3
(2) DISPLAY CONTENT OF LABEL #1 TO LABEL #2
(3) CONTENT OF LIST DATA TO LABEL #1

FIG.14

```
ACTION DEFINITION (SCROLL-UP)

1) START-UP EVENT
   WHEN [BUTTON HELD-DOWN EVENT] OF [SCROLL-UP COMPONENT] IS GENERATED,
2) ACTIVATING CONDITION
   IF [CURRENT DISPLAY POINTER] OF [LIST DISPLAY COMPONENT] IS LARGER THAN
   [DISPLAY LIST TOP POINTER] OF [LIST DISPLAY COMPONENT]
3) PROCESS OPERATION
   SUBSTITUTE [LABEL #3 DISPLAY CHARACTER STRING] OF [LIST DISPLAY COMPONENT]
   WITH [LABEL #2 DISPLAY CHARACTER STRING] OF [LIST DISPLAY COMPONENT].
   SUBSTITUTE [LABEL #2 DISPLAY CHARACTER STRING] OF [LIST DISPLAY COMPONENT]
   WITH [LABEL #1 DISPLAY CHARACTER STRING] OF [LIST DISPLAY COMPONENT].
   SUBTRACT 1 FROM [CURRENT DISPLAY POINTER] OF [LIST DISPLAY COMPONENT].
   EXECUTE [METHOD #1] OF [LIST DISPLAY COMPONENT].
   SUBSTITUTE [LABEL #1 DISPLAY CHARACTER STRING] OF [LIST DISPLAY COMPONENT]
   WITH [METHOD #1 RESULT STORAGE] OF [LIST DISPLAY COMPONENT].
   SUBSTITUTE [GEOGRAPHICAL NAME #1 CHARACTER STRING] OF [LABEL #1 COMPONENT]
   WITH [LABEL #1 DISPLAY CHARACTER STRING] OF [LIST DISPLAY COMPONENT].
   SUBSTITUTE [GEOGRAPHICAL NAME #2 CHARACTER STRING] OF [LABEL #2 COMPONENT]
   WITH [LABEL #2 DISPLAY CHARACTER STRING] OF [LIST DISPLAY COMPONENT].
   SUBSTITUTE [GEOGRAPHICAL NAME #3 CHARACTER STRING] OF [LABEL #3 COMPONENT]
   WITH [LABEL #3 DISPLAY CHARACTER STRING] OF [LIST DISPLAY COMPONENT].
```

FIG.15

EXAMPLE OF ACTION DEFINING FORMATS BY
CATEGORIES (PORTION OF CATEGORIES)

•ACTIVATING CONDITION:
--EVENT
 WHEN [EVENT] OF [COMPONENT] IS GENERATED,
--NUMERICAL VALUE COMPARISON
 WHEN [PROPERTY (NUMERICAL VALUE TYPE)] OF [COMPONENT] IS EQUAL TO [CONSTANT (NUMERICAL VALUE TYPE)]
 WHEN [PROPERTY 1 (NUMERICAL VALUE TYPE)] OF [COMPONENT 1] IS EQUAL TO OR SMALLER THAN [PROPERTY 2 (NUMERICAL VALUE TYPE)] OF [COMPONENT 2]
 WHEN [PROPERTY 1 (NUMERICAL VALUE TYPE)] OF [COMPONENT 1] IS LARGER THAN [PROPERTY 2 (NUMERICAL VALUE TYPE)] OF [COMPONENT 2]
  : :
--CHARACTER STRING COMPARISON
 WHEN [PROPERTY 1 (CHARACTER STRING TYPE)] OF [COMPONENT 1] MATCHES [PROPERTY 2 (CHARACTER STRING TYPE)] OF [COMPONENT 2]
 WHEN [PROPERTY 1 (CHARACTER STRING TYPE)] OF [COMPONENT 1] DOES NOT MATCH [PROPERTY 2 (CHARACTER STRING TYPE)] OF [COMPONENT 2]
 WHEN [PROPERTY (CHARACTER STRING TYPE)] OF [COMPONENT] MATCHES [CONSTANT (CHARACTER STRING TYPE)]
  : :
•PROCESS OPERATION:
--NUMERICAL VALUE SETTING
 SUBSTITUTE [PROPERTY 2 (NUMERICAL VALUE TYPE)] OF [COMPONENT 2] WITH [PROPERTY 1 (NUMERICAL VALUE TYPE)] OF [COMPONENT 1].
 SUBSTITUTE [PROPERTY 1 (NUMERICAL VALUE TYPE)] OF [COMPONENT 1] WITH [CONSTANT (NUMERICAL VALUE TYPE)].
 SUBTRACT 1 FROM [PROPERTY 1 (NUMERICAL VALUE TYPE)] OF [COMPONENT 1].
 ADD [PROPERTY 2 (NUMERICAL VALUE TYPE)] OF [COMPONENT 2] TO [PROPERTY 1 (NUMERICAL VALUE TYPE)] OF [COMPONENT 1].
  : :
--CHARACTER STRING SETTING
 SUBSTITUTE [PROPERTY 2 (CHARACTER STRING TYPE)] OF [COMPONENT 2] WITH [PROPERTY 1 (CHARACTER STRING TYPE)] OF [COMPONENT 1].
 SUBSTITUTE [PROPERTY 1 (CHARACTER STRING TYPE)] OF [COMPONENT 1] WITH [CONSTANT (CHARACTER STRING TYPE)].
  : :
--METHOD EXECUTION
 EXECUTE [METHOD] OF [COMPONENT].
--SCREEN CHANGE
 CHANGE TO [SCREEN]

FIG.22

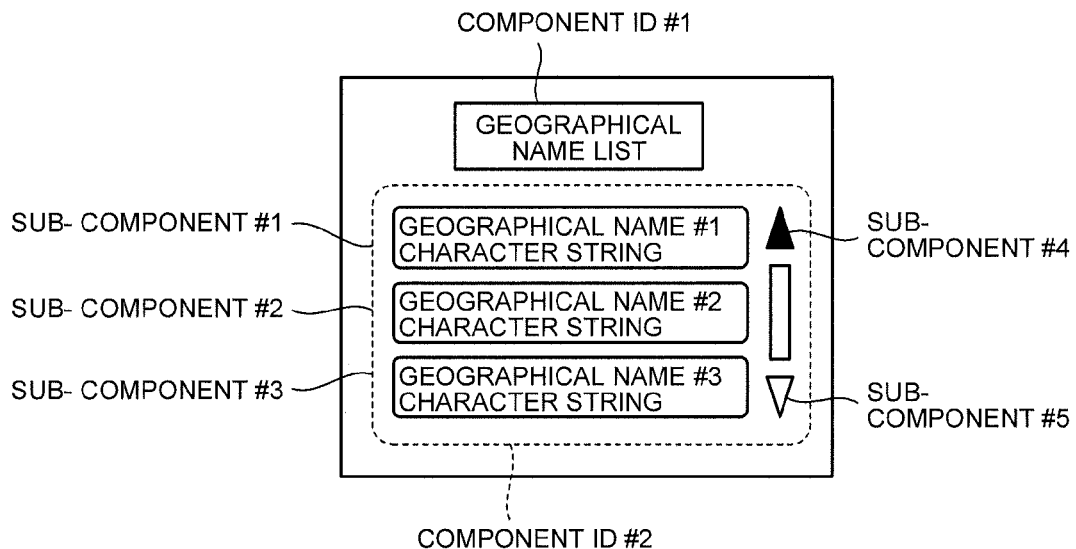

FIG.23

| NO | CLASSI-FICATION | NAME | EXPLANATION |
|---|---|---|---|
| 1 | OPER-ABILITY | NUMBER OF SCREEN CHANGES TO DESTINATION | NUMBER OF SCREENS CHANGED BEFORE OBTAINING INTENDED INFORMATION |
| 2 | | TYPE OF BUTTON | TOUCH/ROTARY SWITCH |
| 3 | | BUTTON DISPOSITION | DISPOSITION OF MULTIPLE SELECT BUTTONS ON SCREEN, ETC. |
| 4 | VISIBIL-ITY | COMPONENT SHAPE AND SIZE | DISTINCTNESS OF INSTRUCTION BUTTONS |
| 5 | | CONSISTENCY IN DISPLAY | SAME INFORMATION IS DISPLAYED IN SAME MANNER ON ANY SCREENS |
| 6 | | LEGIBILITY OF CHARACTERS | HORIZONTAL WRITING /VERTICAL WRITING /DIAGONAL (*) *IF ROAD RUNS DIAGONALLY, DIAGONAL DISPLAY ALONG IT IS EASIER TO VIEW, ETC. |
| 7 | | DESIGN COLOR COMBINATION (HUE) | RELEVANT TO UNIVERSAL |

| SCREEN | COMPONENT | PROPERTY | RESTRICTION CONTENT |
|---|---|---|---|
| A | LIST DISPLAY COMPONENT | CURRENT DISPLAY POINTER | EQUAL TO OR LARGER THAN TOP POINTER & EQUAL TO OR SMALLER THAN END POINTER |
|  |  |  |  |

COMPUTER-READABLE STORAGE MEDIUM, APPARATUS, AND METHOD FOR SUPPORTING OPERATION SCREEN DESIGN

CROSS-REFERENCE TO RELATED APPLICATION

This application is based upon and claims the benefit of priority of the prior Japanese Patent Application No. 2010-227972, filed on Oct. 7, 2010, the entire contents of which are incorporated herein by reference.

FIELD

The embodiment discussed herein is directed to an operation screen design supporting program, an operation screen design supporting apparatus, and an operation screen design supporting method.

BACKGROUND

As an interface for exchanging information between a computer and a user, there is a user interface (UI). On an operation screen of a UI, for example, when a menu displayed on the screen is selected with a mouse, a keyboard, and such, the display screen is changed and various applications are executed. When developing an operation screen of such a UI, the layout of an operation screen, actions of UI components, and the like are set by a developer.

The development of such a UI is carried out in the order of a "UI specification creating process" where a developer determines operations of the UI and describes specifications thereof, a "developing process" where the developer creates a source code, and a "testing process" where the developer verifies operability of the UI by actually operating the UI using the source code generated.

Specifically, in the UI specification process, the developer freely describes content of on-screen processes in natural language to create specifications of the UI. In the developing process, the developer then sees the content of the processes described in the specification process, and carries out coding to describe a source code manually using a programming language to generate the source code. Thereafter, in the testing process, the developer converts the source code generated to an object code, and verifies the operability of the UI by actually operating the UI.

Related-art examples are described in Japanese Laid-open Patent Publication No. 2000-099317 and Japanese Laid-open Patent Publication No. 09-237181.

With the above-described UI developing approach, however, in the UI specification process where the operations of a UI are determined, the operability of the UI is not verified and thus the development of the UI is not carried out promptly. More specifically, in the UI specification process, merely the content of on-screen processes is described in natural language and, after a source code is generated in the developing process, the verification of operability is carried out by actually running the source code in the testing process. Thereafter, when a problem arises in the verification of operability, the specifications of the UI are changed in the UI specification process and the source code is generated again. This creates significant rework causing a delay in the development of the UI.

SUMMARY

According to an aspect of an embodiment of the invention, a non-transitory computer-readable storage medium storing an operation screen design supporting program causing a computer to perform displaying a format that allows information relevant to a condition of an element displayed on an operation screen to be activated and information concerning content of process that the element operates to be described in a given form, and receiving the information relevant to the condition of the element to be activated and the information concerning the content of process that the element operates based on the format; and displaying an operation screen based on the information relevant to the condition of the element to be activated and the information concerning the content of process that the element operates received, and carrying out a simulation of operation of the element displayed on the operation screen.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a diagram illustrating a display example of a screen edit view;

FIG. 3 is a diagram illustrating a display example of a component display setting view;

FIG. 6 is a diagram illustrating a display example of the action defining format selection view;

FIG. 7 is a diagram illustrating a display example of a component attribute selection view;

FIG. 8 is a diagram illustrating a display example of the component attribute selection view;

FIG. 9 is a diagram illustrating a display example of the component attribute selection view;

FIG. 14 is a diagram illustrating an example of definition of an action that executes scroll-up;

FIG. 15 is a diagram illustrating an example of an action defining format;

FIG. 22 is a diagram illustrating an example of a verifier execution screen;

FIG. 23 is a chart illustrating an example of metrics for UI operations;

DESCRIPTION OF EMBODIMENT

Preferred embodiments of the present invention will be explained with reference to accompanying drawings. However, the invention is not intended to be restricted by the embodiment.

In the following embodiment, a configuration and a processing flow of a UI specification creating apparatus are described in sequence, and lastly, an effect of the embodiment will be described.

Configuration of UI Specification Creating Apparatus

Figure 1:
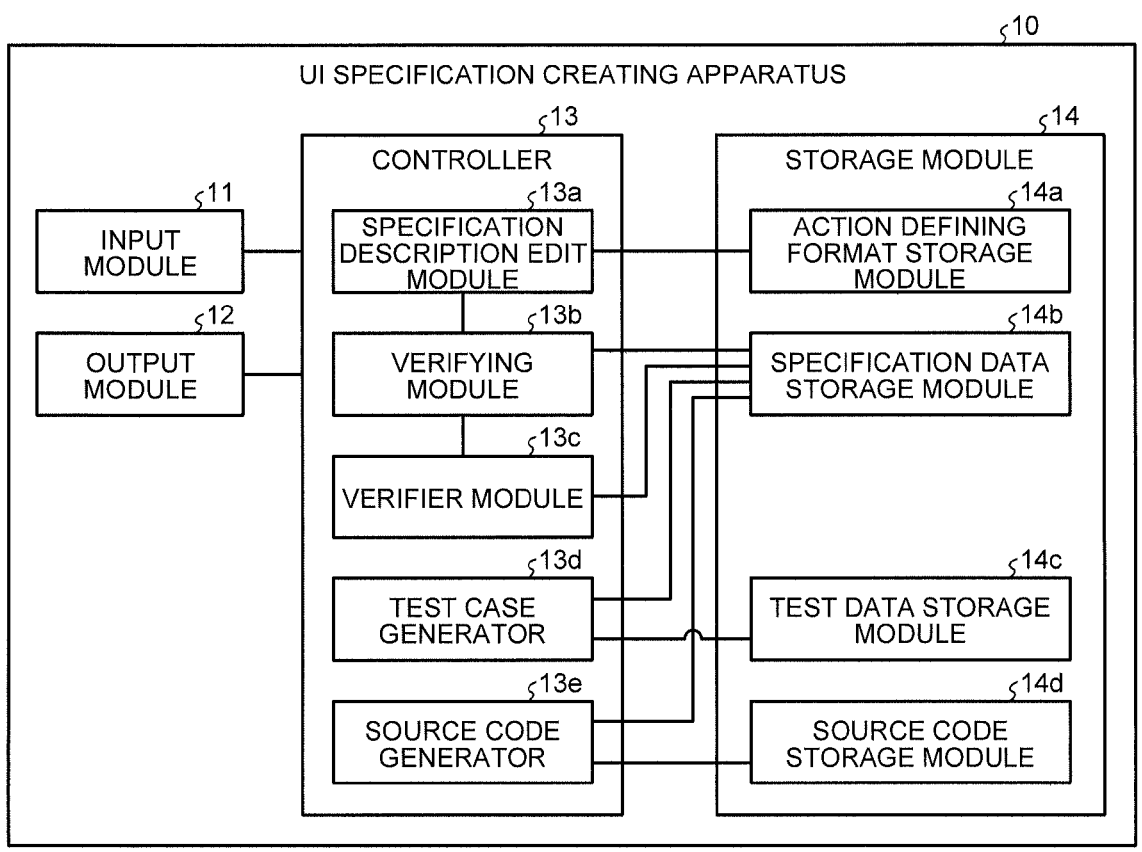
FIG. 1 is a block diagram illustrating a configuration of a UI specification creating apparatus according to an embodiment of the invention.

With reference to FIG. 1, the configuration of a UI specification creating apparatus 10 will be explained first. FIG. 1 is a block diagram illustrating the configuration of the UI specification creating apparatus 10 according to the embodiment. As illustrated in FIG. 1, the UI specification creating apparatus 10 includes an input module 11, an output module 12, a controller 13, and a storage module 14. The respective processes of the foregoing modules will be explained below.

The input module 11 is for inputting descriptions concerning specifications and such, and includes a keyboard and a mouse, a microphone, and the like. The output module 12 is, as described later, for displaying a screen edit view, a component display setting view, an action definition related view, and the like, and includes a monitor (or a display, or a touch panel) and a speaker.

The controller 13 includes an internal memory for storing therein a program that defines procedures of various processes and such and data, carries out various processes, and further includes a specification description edit module 13a, a verifying module 13b, a verifier module 13c, a test case generator 13d, and a source code generator 13e.

The specification description edit module 13a displays an action defining format that allows information relevant to an activating condition of a component displayed on an operation screen of a UI and information concerning content of process that the component operates to be described in a given form, and receives the description concerning specifications of the component based on the action defining format. Specifically, the specification description edit module 13a displays, on the output module 12, a screen edit view where an arrangement of a component on a screen is edited, a component display setting view where UI components and functional components that operate various functions on a screen are set, and an action definition related view that is related to an action definition. The specification description edit module 13a further receives operational instructions from a worker via the input module 11, selects an action defining format stored in an action defining format storage module 14a, and edits attributes of components.

With reference to drawings, a screen edit view, a component display setting view, and an action definition related view that the specification description edit module 13a displays will be described. FIG. 2 is a diagram illustrating a display example of a screen edit view. As illustrated in FIG. 2, the screen edit view displays "management information display" that displays management information of a screen to be edited, a "component list" that displays a list of UI components (normally, present in a DB and such in a system) available to be displayed on the screen, and a "screen layout display" that displays a layout of a screen. The operational instructions from a creator of UI specifications are received via the input module 11, and components to be set are arranged by dragging and dropping them from the component list onto the screen layout so as to generate a screen. In the example illustrated in FIG. 2, a label component and a list displaying component are taken out from the component list display portion and are arranged on a screen A.

A component display setting view will be described. A component display setting view is displayed, for example, by double-clicking a given component on a "screen layout display" in a screen edit view. As illustrated in FIG. 3, in a component display setting view, attributes (such as shape, color, and display condition) of a UI component arranged are specified. FIG. 3 is a diagram illustrating a display example of a component display setting view.

An action definition related view will be explained. In an action definition related view, a setting of action for each UI component is received. In the setting of action for a UI component, a form of direction from a user, a process of operation, and an activating condition whether to execute the process are created as a UI action definition that is a unified form of activating condition and process operation. In this regard, an action defining format is used that is in a form accompanied with linguistic expression of activating condition and process operation. The action definition related view is configured with an action defining format selection view and a component attribute selection view. In the action defining format selection view, the worker selects an action defining format for creating an action definition.

Figure 4:
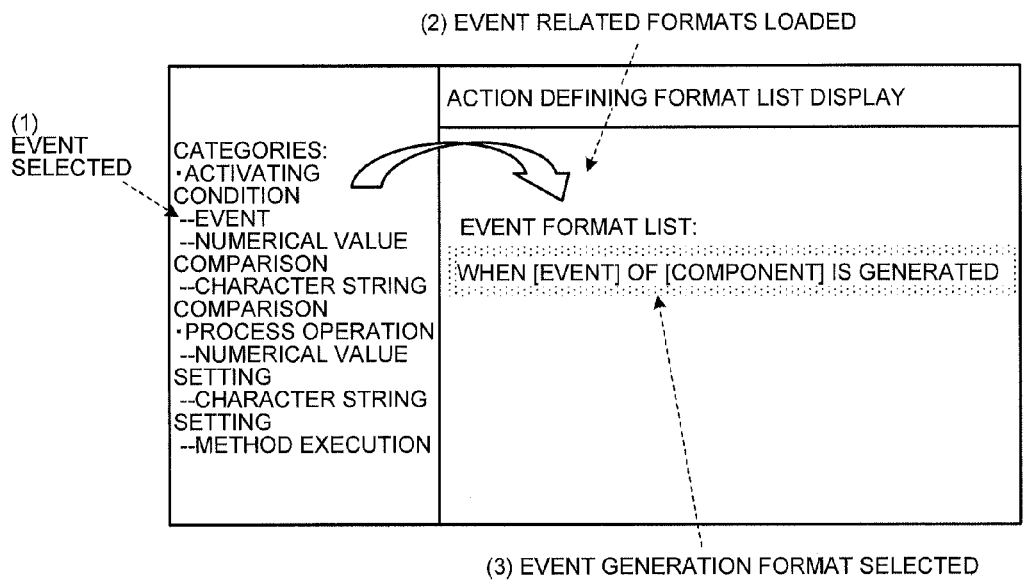
FIG. 4 is a diagram illustrating a display example of an action defining format selection view.
Figure 5:
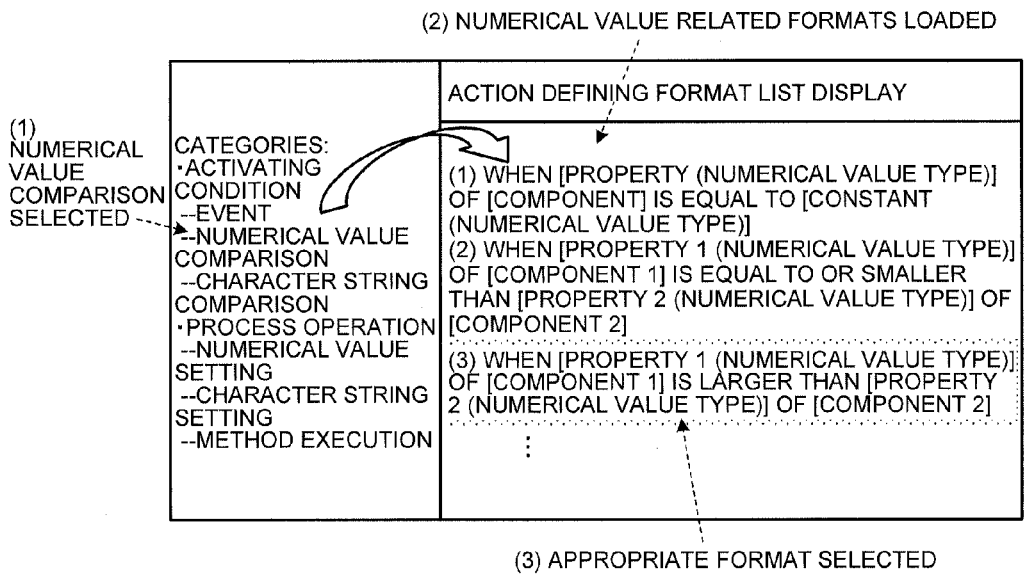
FIG. 5 is a diagram illustrating a display example of the action defining format selection view.

With reference to FIGS. 4 to 6, an action defining format selection view will be explained. FIGS. 4 to 6 are diagrams illustrating display examples of an action defining format selection view. The specification description edit module 13a first receives instructions to select an activating condition or a process operation and which type of property to be operated from categories of an action defining format in a category window on the left side of the view. When one of the categories is selected with a mouse click in the category window on the left side of the view, the specification description edit module 13a displays a list of action defining formats that belong to the selected category on the right side of the view. When the specification description edit module 13a receives a selection of action defining format in the list, the specification description edit module 13a displays a component attribute selection view on the screen.

Figure 10:
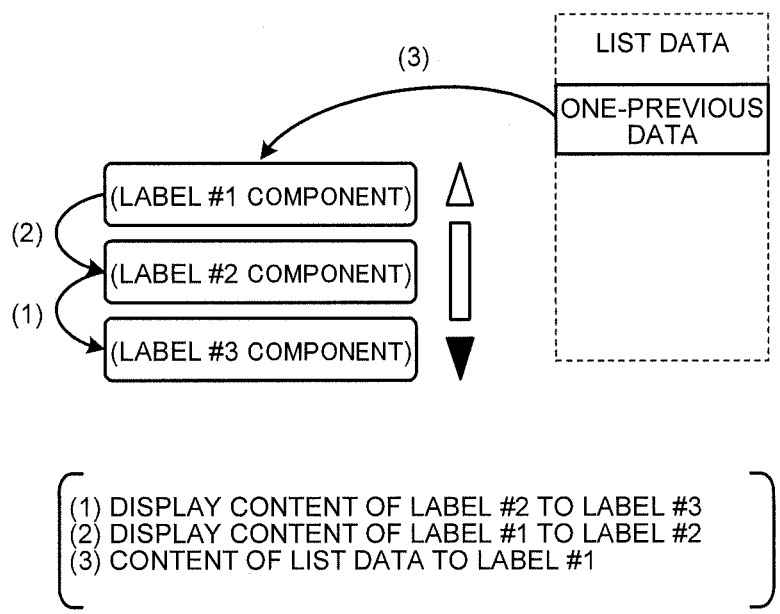
FIG. 10 is a diagram illustrating a scroll-up action of a list display component.

In a component attribute selection view, a component that is set in a selected action defining format, and a property, an event, and a method as attributes of the component are specified. FIGS. 7 to 9 are diagrams illustrating display examples of a component attribute selection view. For example, in a component attribute selection view, as exemplified in FIGS. 7 to 9, a list of components present on a screen in which the specifications are currently under consideration, is laid out on the left side of the view. When a selection of an intended component in the list is received, the list of attributes registered for the component is loaded on the right side of the view. Selecting an attribute on the right side of the screen can specify a component and attributes. In the examples in FIGS. 7 to 9, out of the list of attribute names, the names in bold indicate selectable attributes. Accordingly, an action definition can eventually be created. For example, as illustrated in FIG. 10, an action definition for a process of scrolling displayed data upwards is created as an action on a screen. FIG. 10 is a diagram illustrating a scroll-up action of a list display component. The action defining format selection view, the component attribute selection view, and the action definition for the process illustrated in FIGS. 4 to 10, will be described in detail later.

Figure 11:
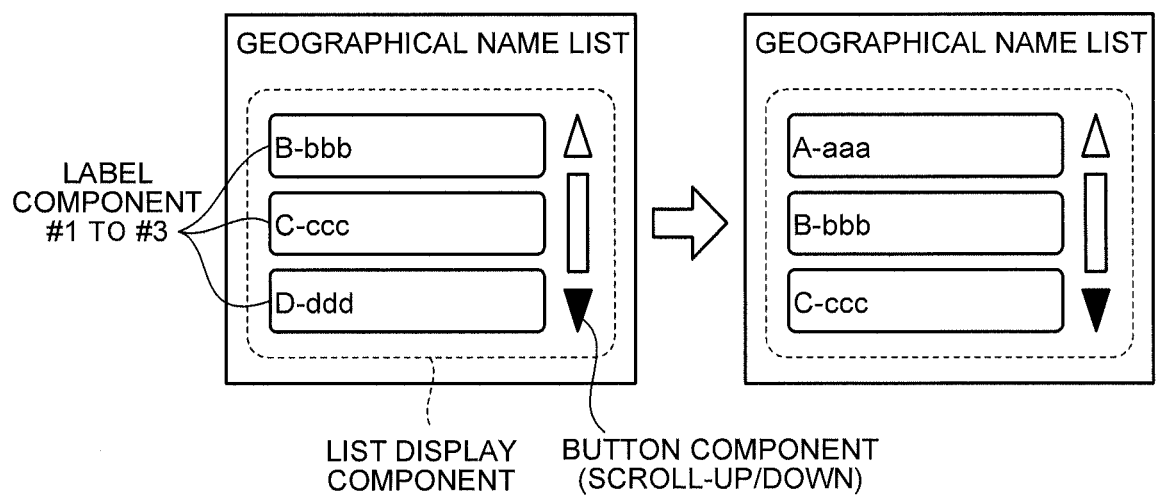
FIG. 11 is a diagram illustrating a specific example of UI operation.

A specific method of creating a UI specification description will be described. With reference to FIG. 11, a specific example of a UI operation will be explained. FIG. 11 is a diagram illustrating a specific example of a UI operation. In the followings, an example of creating specifications of the UI operation exemplified in FIG. 11 will be explained. In FIG. 11, a list of geographical names is displayed on a screen using a list display component. The list display component is a combined component and is arranged with a button component for referring to a lower item (for scroll-down instructions v) and a button component to scroll-up (a scroll-up key A) on the right side of three label components.

Figure 12:
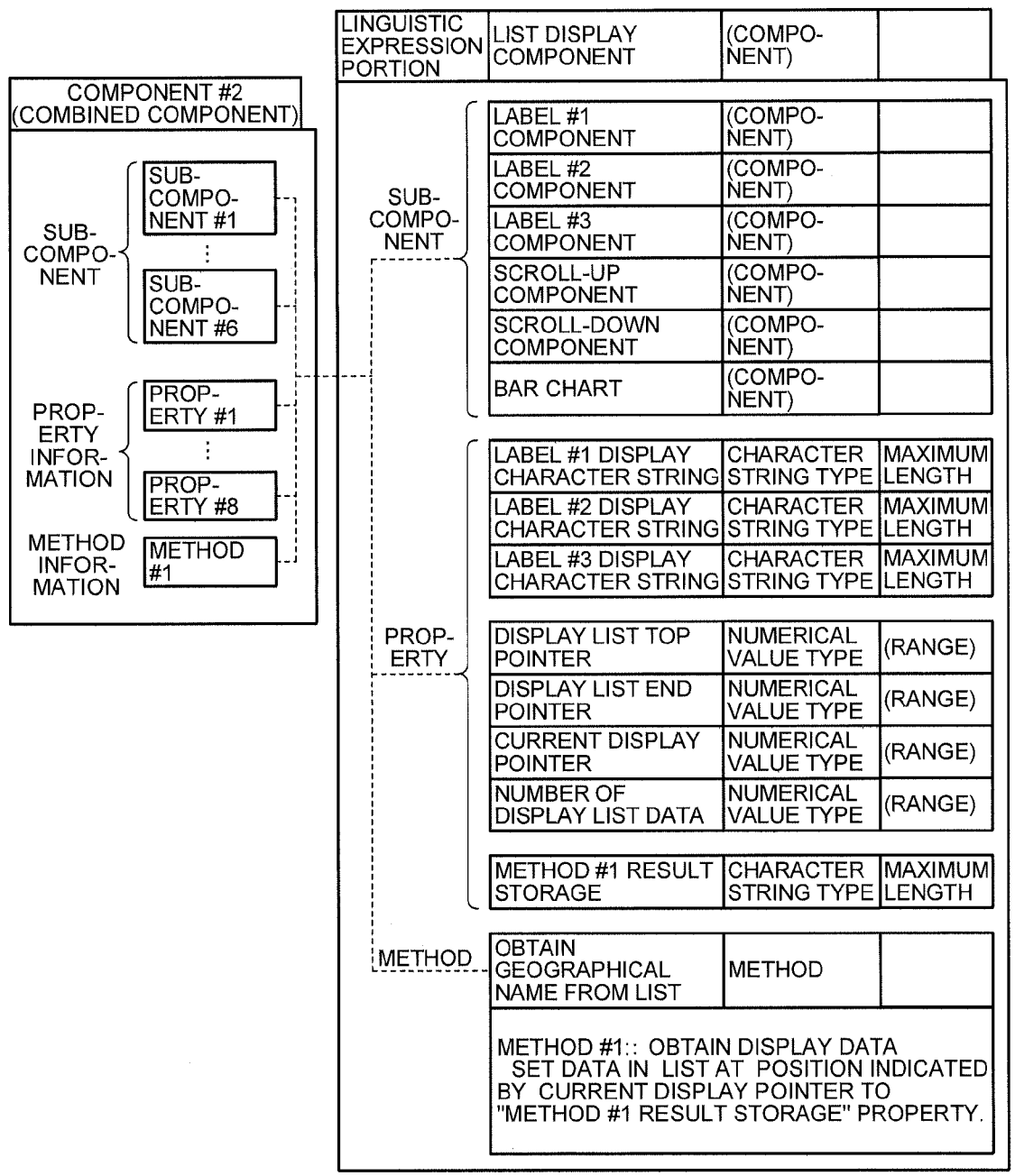
FIG. 12 is a diagram illustrating a specific example of a data structure of a list display component.
Figure 13:
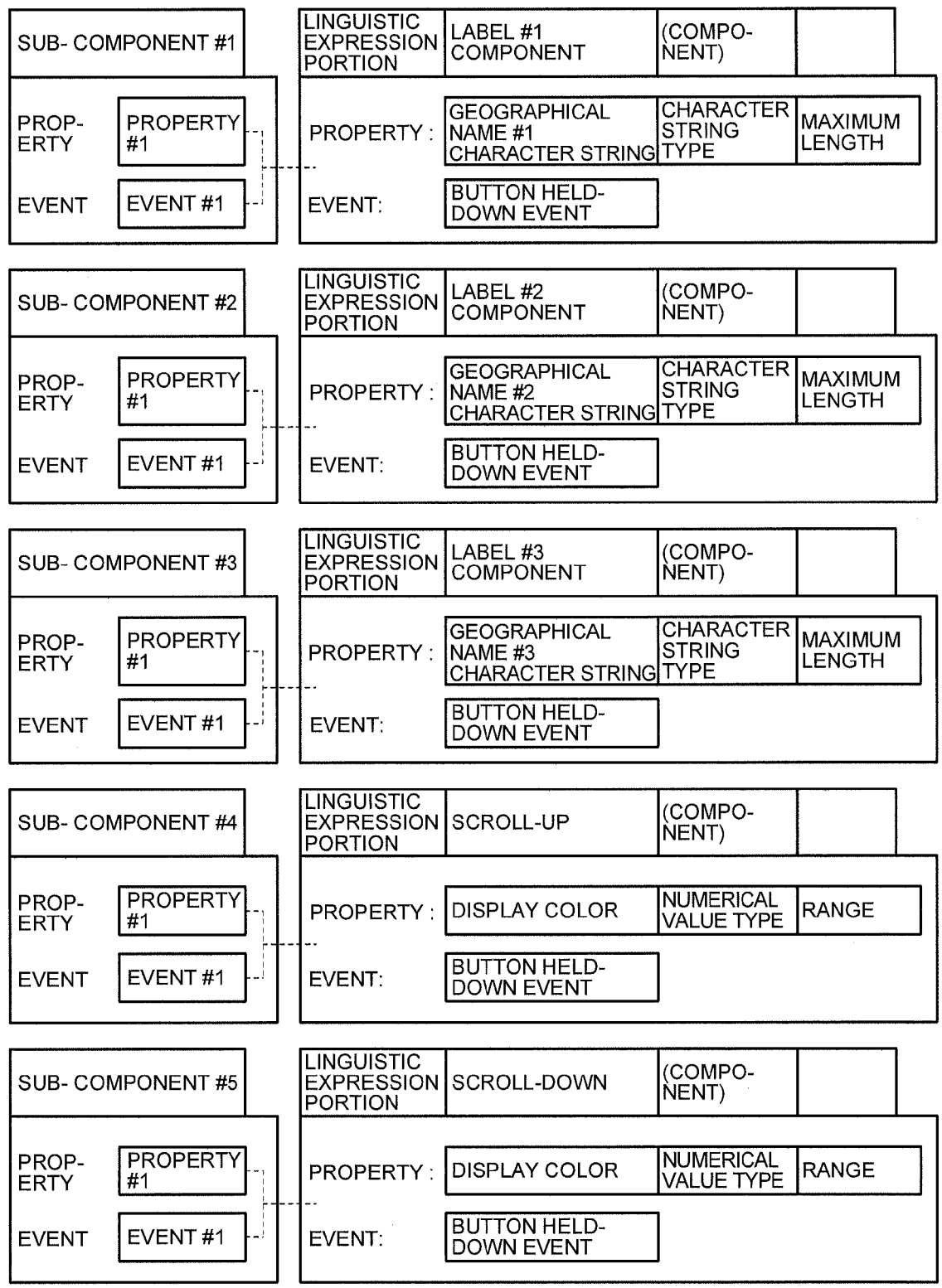
FIG. 13 is a diagram illustrating a specific example of a data structure of the list display component.

FIGS. 12 and 13 illustrate internal data structures of the list display component depicted in FIG. 11. FIGS. 12 and 13 are diagrams illustrating specific examples of data structures of the list display component. As exemplified in FIG. 12, the data structure holds, as attribute information, a sub-component list, character string data that is displayed on the three label components, and information indicative of properties relevant to a list from which the display data is brought. As for sub-components, the data structure includes label components for displaying character string data, button components for scroll-up and scroll-down instructions, and a bar chart component that indicates where the data displayed on the three label components are located in the list. In FIG. 13, the explanation of the bar chart component is omitted.

A procedure of setting up UI operation specifications will be explained with an example of UI operation specifications for when a user holds down a button component to scroll-up. As a procedure to set up UI operation specifications, arrangement of components is set, attributes of the components are set, and action definitions of the components are set. Specifically, as for setting the arrangement of components, using a screen edit view, the label components, the button components to scroll-up and -down, and the bar chart component are arranged, and their respective locations and sizes are set. As for setting the attributes of the components, using a component display setting view, display colors, sizes, and shapes of the respective components are specified. For example, for the button components to scroll-up and down, a triangle shape is set.

When setting up a start-up event as an action definition for a component, for example, a button held-down event that is generated at the time a scroll-up button is held down is set as a start-up event. As exemplified in FIG. 4, in the category display portion of the action defining format selection view (on the left side in FIG. 4), the selection of an event category is received. Then, in the action defining format list display portion (on the right side in FIG. 4), a list of formats that belong to the event category is displayed, from which the format displayed is selected.

When the format is selected, as exemplified in FIG. 7, a component attribute selection view is displayed to specify a component and its attributes described in the format. On the left side of the component attribute selection view, a list of components that belong to the screen is displayed, from which the scroll-up button is selected. On the right side of the screen, a list of attributes that belong to the scroll-up component is displayed, from which a button held-down event is selected. While the attributes of the scroll-up button include properties such as a button display color and a button shape, because the action defining format relevant to the event is already specified as a format, the event attribute only is displayed here.

A situation where an activating condition is set as an action definition of a component will be explained. For example, as an activating condition, when viewing data at an upper portion of a list in list display, and when the uppermost data is already displayed, a scroll-up operation is not performed. This activating condition can be determined based on whether a current display pointer of a list display component is larger than a display list top pointer. To set up such an activating condition, as illustrated in FIG. 5, in an action defining format selection view, a numerical comparison is selected as a category. Then, a plurality of numerical comparison formats are displayed in an action defining format list view, from which a format that compares numerical value type properties between components is selected.

When the format is selected, as illustrated in FIG. 8, similarly to setting up a start-up event, component attribute selection view for setting up a component and its attributes is displayed. Because a format where there are two components present is selected this time, the component attribute selection view is displayed twice. In the first displayed component attribute selection view, a list display component is selected from the component list. Accordingly, the attributes that the list display component includes are displayed. Because a format relevant to the property of numerical value type is selected this time, the properties of a character type such as a "label #1 character string" are not displayed. From the attributes displayed, a "current display pointer" is selected. In the second displayed component attribute selection view, the property of a "display list top pointer" of the list display component is selected in a similar manner. Consequently, this sets up a condition of "when the current display pointer of the list display component (numerical value type) is larger than the display list top pointer of the list display component (numerical value type)".

An instance of setting up a process operation as an action definition for a component will be explained. For example, as illustrated in FIG. 10, the process of scrolling display data upwards as an action on a screen is as follows. Specifically, (1) a geographical name #3 character string of a label #3 component is substituted with a geographical name #2 character string of a label #2 component. (2) The geographical name #2 character string of the label #2 component is substituted with a geographical name #1 character string of a label #1 component. (3) One is subtracted from the current display pointer, and (4) the geographical name #1 character string of the label #1 component is substituted with a character string read from list data that is the data of character strings to be displayed on list display components.

The content of setting on a tool for realizing the above-described processes (1) to (4) is as follows. (1) The property of a "label #3 display character string" of the list display component is substituted with the property of a "label #2 display character string" of the list display component. (2) The property of the "label #2 display character string" of list display component is substituted with the property of a "label #1 display character string" of the list display component. (3) One is subtracted from the property of the "current display pointer" of the list display component. (4) A method #1 of the list display component is executed. (5) The property of the "label #1 display character string" of the list display component is substituted with the property of "method #1 result storage" of the list display component. (6) The property of the "geographical name #1 character string" of the label #1 component is substituted with the property of the "label #1 display character string" of the list display component. (7) The property of the "geographical name #2 display character string" of the label #2 component is substituted with the property of the "label #2 display character string" of the list display component. (8) The property of the "geographical name #3 display character string" of the label #3 component is substituted with the property of the "label #3 display character string" of the list display component.

The above-described processes (1) to (8) are set in sequence using action defining format selection views and component attribute selection views. As one example, operations to set the process operation (7) are exemplified in FIGS. 6 and 9. As illustrated in FIG. 6, in an action defining format selection view, character string setting is selected as a category. A plurality of formats relating to character string setting are then displayed in the action defining format list display view, from which a format for substituting the properties of a character string type between components is selected. Subsequently, as illustrated in FIG. 9, in a component attribute selection view, a list display component is selected as a component 1 to be set in the format, and the label #2 display character string is selected as a property 1. Consequently, this sets up the process operation of the process (7) above.

An example of action definition that executes the scroll-up set up in the above manner is illustrated in FIG. 14. FIG. 14 is a diagram illustrating an example of definition of an action that executes scroll-up. As illustrated in FIG. 14, a "start-up event" indicative of an event that causes an action of a component, an "activating condition" indicative of a condition to activate the component, and a "process operation" indicative of content of operation of the component are set as an action definition.

For example, as illustrated in FIG. 14, as the "start-up event", it is set that an action of a component is generated such as a button component on a screen to be held down. As the "activating condition", it is set that a process operation is carried out under a condition of the current display pointer of the list display component being larger than the display list top pointer of the list display component. As the "process operation", it is set that, for example, "the label #3 display character string of list display component is substituted with the label #2 display character string of the list display component".

An example of action defining formats is illustrated in FIG. 15. FIG. 15 is a diagram illustrating an example of action defining formats. As illustrated in FIG. 15, the action defining formats are arranged by categories. As categories, there are activating conditions and process operations. As the category of activating conditions, event, numerical value comparison, and character string comparison are included, and as the category of process operations, numerical value setting, character string setting, method execution, and screen change are included. For example, the UI specification creating apparatus 10 stores therein an action defining format of "when an event of a component is generated" in the category of event in activating conditions.

Figure 16:
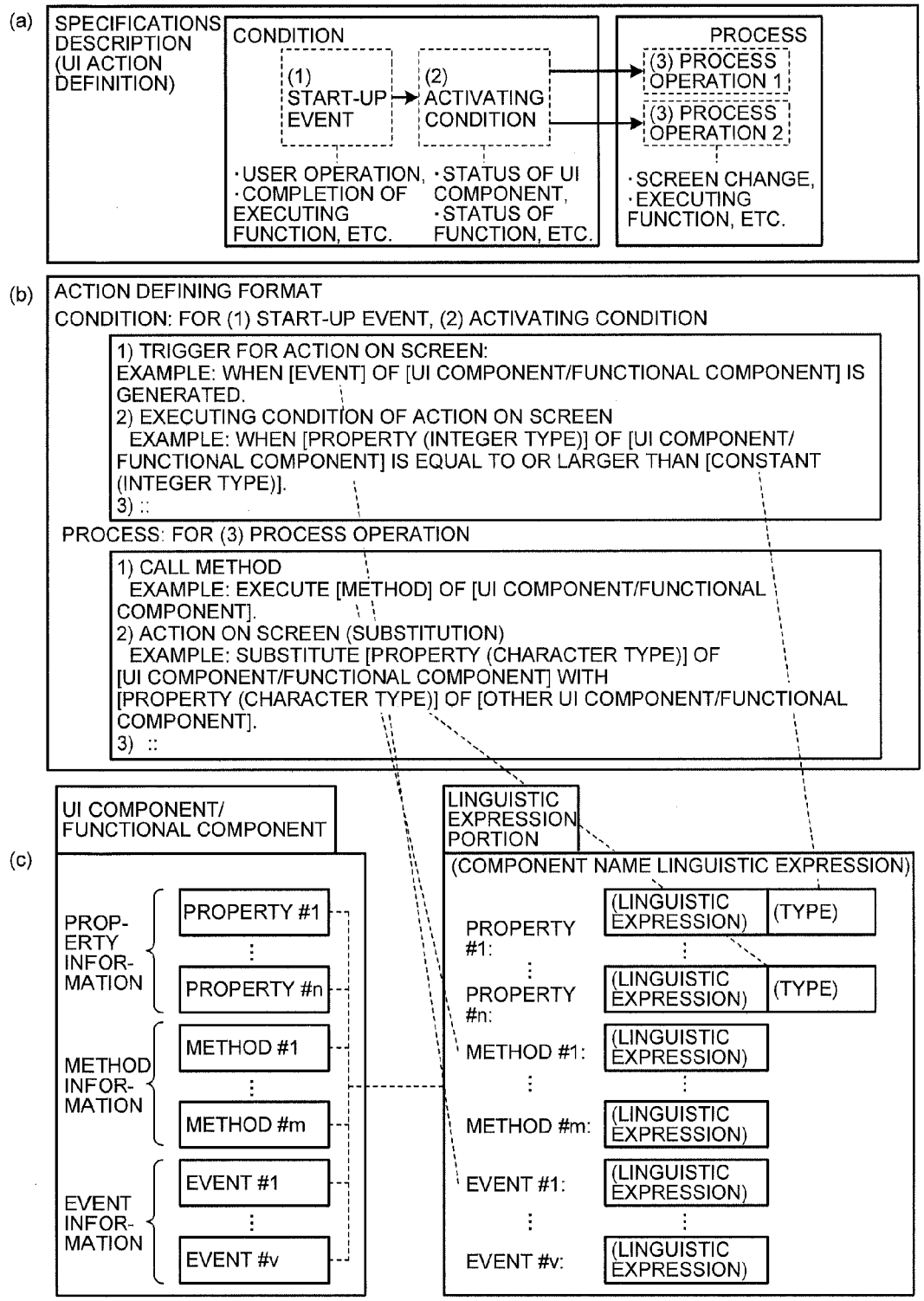
FIGS. 16A to 16C are a group of diagrams illustrating data structures of an action defining format and a list display component.

Accordingly, the specification description edit module 13a allows a start-up event, an activating condition, and a process operation to be described in accordance with action defining formats, and stores the described data as specification data in a specification data storage module 14b. With reference to FIGS. 16A to 16C, a series of processes to describe a start-up event, an activating condition, and a process operation in accordance with action defining formats and to store the described data as specification data will be explained. FIGS. 16A to 16C are a group of diagrams illustrating data structures of an action defining format and a list display component.

As illustrated in FIG. 16A, the operation of a UI component is separated into a condition and a process. As the definition of a condition of a UI component, the specifications definition of a start-up event and an activating condition are described in the specification description edit module 13a. As a start-up event, a user holding down a component on a screen, execution of a function previously operated being finished, and such can be conceived. In any event, the system is notified as a form of an event. The activating condition describes a condition under which a UI operation is activated when a start-up event is generated. There is also an instance where no activating condition is set and a UI operation is activated unconditionally whenever a start-up event is generated. The operation of a UI component is described in a form of process operation. The process operation specifies, other than the change of a component on a screen and screen change, a function or the like that operates within the system (application). An example is an action that, when a button on a screen is held down, not an operation on a screen, but an operation of the body of the built-in system is executed.

The specification description edit module 13a receives descriptions on the above-described operations and conditions of UI components in accordance with an action defining format illustrated in FIG. 16B. As illustrated in FIG. 16B, an action defining format is a prescribed form for UI components and functional components and their parameters arranged to specify start-up events, activating conditions, and process operations, and is composed of fields for setting components and parameters and linguistic expression indicative of operations. The use of linguistic expression allows a worker who is not familiar with software structure of UI operations to create specifications of the UI operations.

For example, when specifying a start-up event, an action defining format of "when an event of a UI component/functional component is generated" is used. In the format, the worker specifies a component for which he/she wants to set a start-up event in the portion of "UI component/functional component" and then specifies which event to use in the portion of "event".

An action defining format that specifies an activating condition is a description indicative of a state which the property of a UI component is in, and various formats are prepared according to types of properties and comparing methods thereof. For example, when determining whether the color of a button is black, the worker uses an action defining format of "if the property (integer type) of a UI component/functional component is equal to a constant (integer type)", and sets a button component as the UI component/functional component and sets a display color property as the property (integer type). The worker further specifies an integer value for comparison. Formats to set up process operations include a format that specifies an execution method of a UI component, and a format that carries out substitution or calculation of property data such as "substitute the property (integer type) of a UI component/functional component with the property (integer type) of another UI component/functional component".

In FIG. 16C, an example of list display components is illustrated. As illustrated in FIG. 16C, the list display components are structured with UI components and functional components, and a linguistic expression portion. Furthermore, as illustrated in FIG. 16C, the data structure of UI components includes, as the data to specify display content and action of components, a "property" to indicate display content, and a "method" and an "event" as the information to specify actions. The property is a various attribute value of a component or data that the component has. For example, it includes a shape of the component, a location thereof on a screen, a normal color thereof, a color thereof when held down, and character string data to be displayed thereon. Each property includes information specifying an attribute or a range of setting value of data stored. The method is an operation associated with the component. For example, it includes a process to add +1 to a current display pointer value of a list display component. The event indicates an event of various types the component issues. For example, it includes a button held-down event notifying that the button is held down.

The data structure of components is common to functional components that operate various functions operating within the built-in system upon receiving instructions from UI components on a screen. As for the method, for example, an operation to give instructions to turn an air conditioner on or off can be defined. As for the event, an event issued when an operation specified by a method is finished normally or the like can be defined. For example, it includes a start-up completion event that is issued when a start-up method is executed and started up normally. As for the property, the data to notify a parameter to call a method, a status of operation, and such can be set.

Furthermore, UI components and functional components are accompanied with, although omitted in the drawings, an executable software module provided with a certain interface to be executed by a simulator and source code information to generate a source code. UI components and functional components are further accompanied with linguistic information that is used when a specification reviewer who is not familiar with the software structure of UI operations creates specifications of the UI operations.

Figure 17:
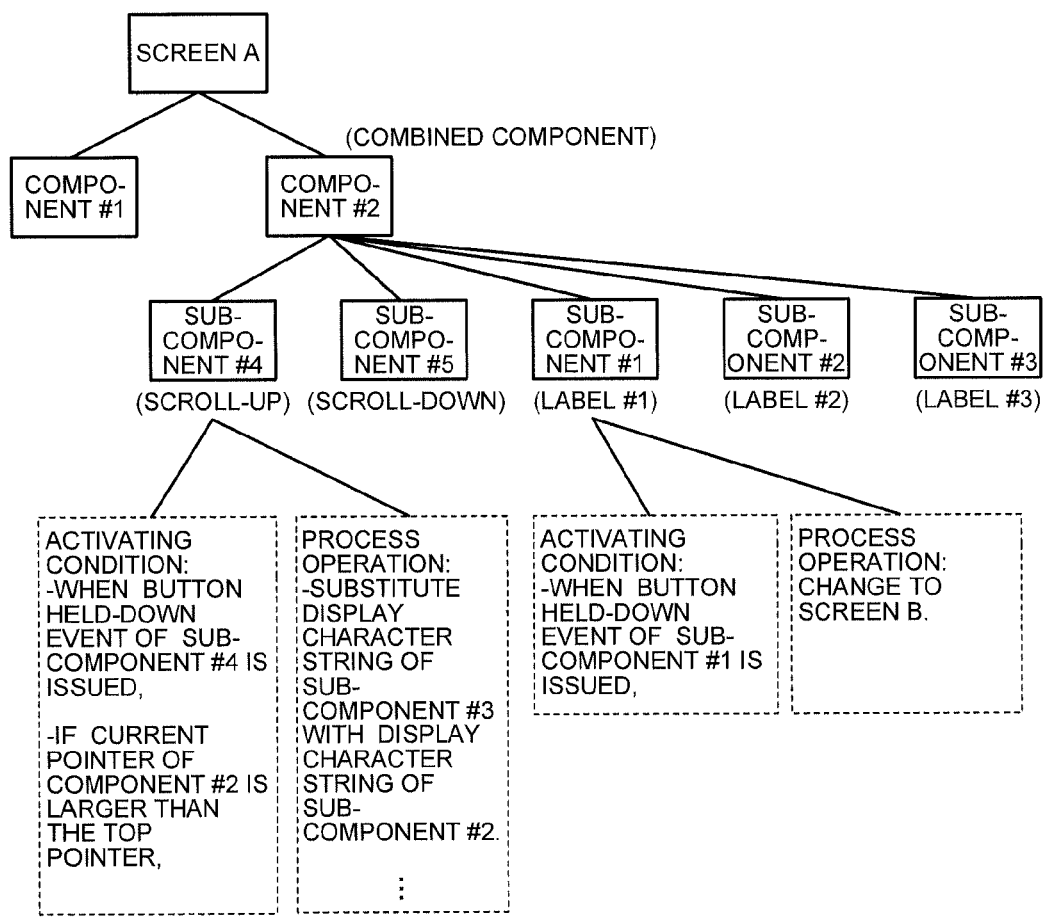
FIG. 17 is a diagram illustrating an example of specification data in a tree structure.
Figure 18:
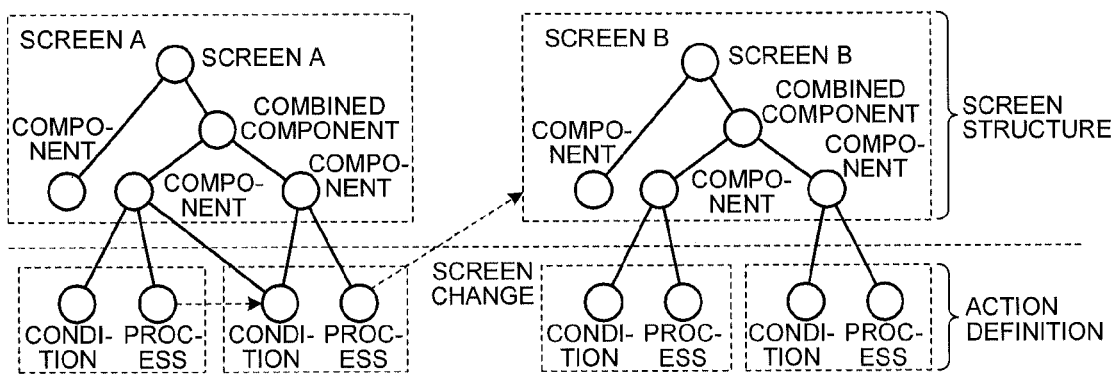
FIG. 18 is a diagram illustrating an example of specification data in a tree structure.

With reference to FIGS. 17 and 18, the structure of specification data received in accordance with action defining formats will be explained. FIGS. 17 and 18 are diagrams illustrating examples of specification data in tree structures. The specification description edit module 13a converts, as illustrated in FIGS. 17 and 18, specification data into data in a tree structure. As illustrated in FIG. 17, a screen A is defined as a top node and is connected with a component #1 and a component #2 of a combined component as lower nodes. The component #2 of a combined component is connected with sub-components #1 to #5 as lower nodes.

In the sub-components, activating conditions and process operations are defined. For example, a label #1 of the sub-component #1 is defined with "if a button held-down event of the sub-component #1 is issued" as an activating condition and with "change to a screen B" as a process operation. Accordingly, when there is a screen change, as illustrated in FIG. 18, the data is made in a tree structure such that the screen A changes to the screen B.

Figure 19:
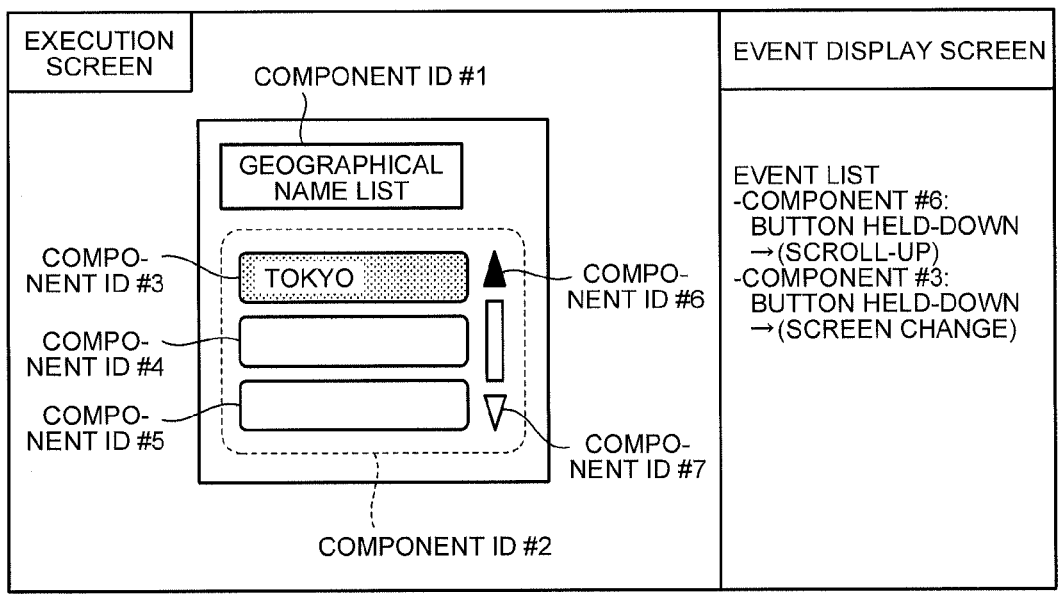
FIG. 19 is a diagram illustrating an example of a simulation operation screen.

The verifying module 13b displays an operation screen of a user interface and verifies operations of the components displayed on the operation screen of the user interface based on the information relevant to conditions of the components to be activated and the information concerning content of processes that the components operate. Specifically, the verifying module 13b scans specification data for each screen in tree structure from the top node and extracts components to which events are set. The verifying module 13b then displays, as exemplified in FIG. 19, an event list together with a screen in execution on a simulation operation screen. FIG. 19 is a diagram illustrating an example of a simulation operation screen.

After an simulation operation screen is displayed, a simulation operator verifies UI operations by issuing events in the execution screen with reference to an event list that is a list of events displayed in the event display screen. In this way, checking of operations for all events can be carried out fully. When the execution of simulation is started by issuing an event such as holding down a button on the simulation execution screen, the verifying module 13b then notifies the respective components of the operation. Each component is accompanied with an execution module, and the module is started up and an activating condition or a process operation is executed. Depending on the content of a process operation, the operation of another component may be specified and, in such a case, the execution module of the other component is notified. For example, as exemplified in FIG. 19, the content of a process when a scroll-up component of component #6 is held down can be checked in the simulation operation screen.

Figure 20:
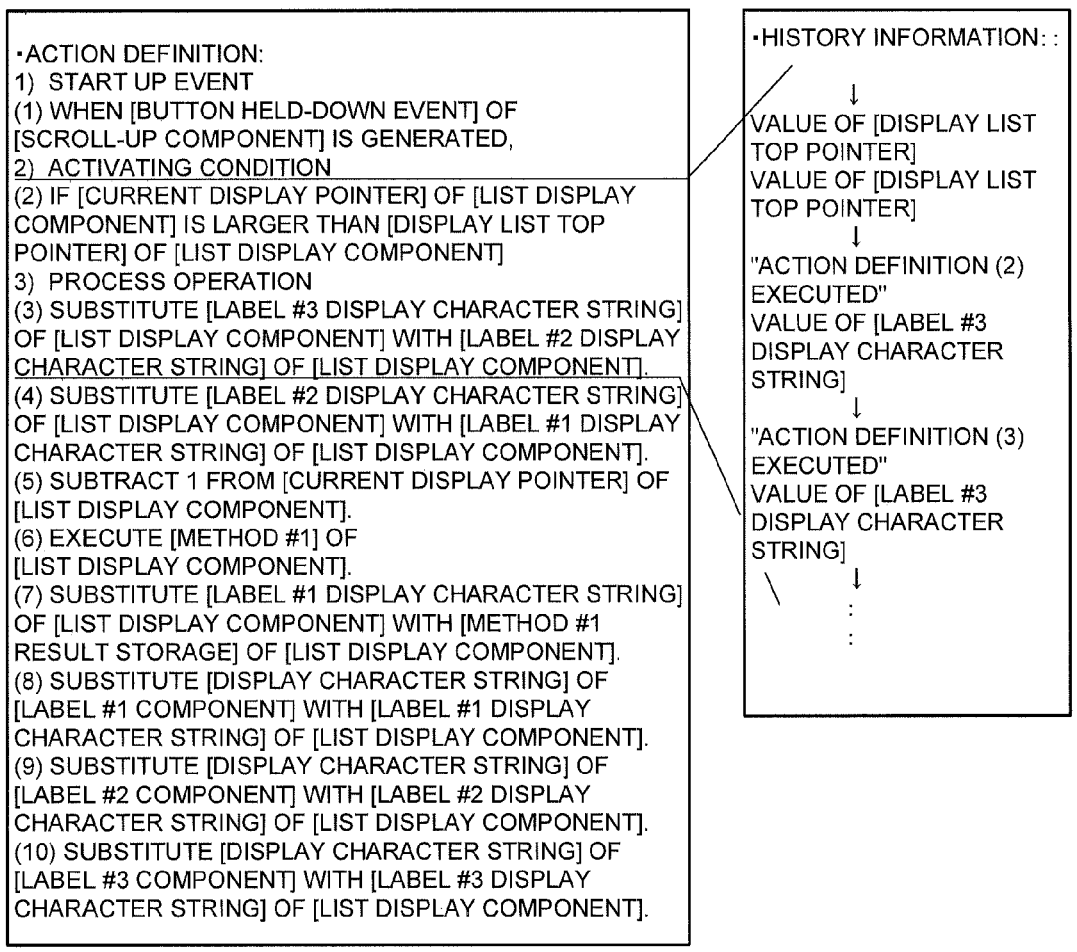
FIG. 20 is a diagram illustrating an example of simulation history information.

Because the respective actions and operations in simulation are processed by action definitions, history information of simulation can accumulate the action definitions executed and the property values of components before and after the execution. For example, an example in FIG. 20 illustrates the action definitions at the time the scroll-up component is held down in the screen A, the situations of passage of execution of action definitions that can be set in the simulation, and the situations of changes in property values. While the settings become complicated when extracting detailed execution history of UI operations, a break point may be set in an action definition to make it easier to check operations in detail with a simple setting operation. FIG. 20 is a diagram illustrating an example of simulation history information.

Figure 21:
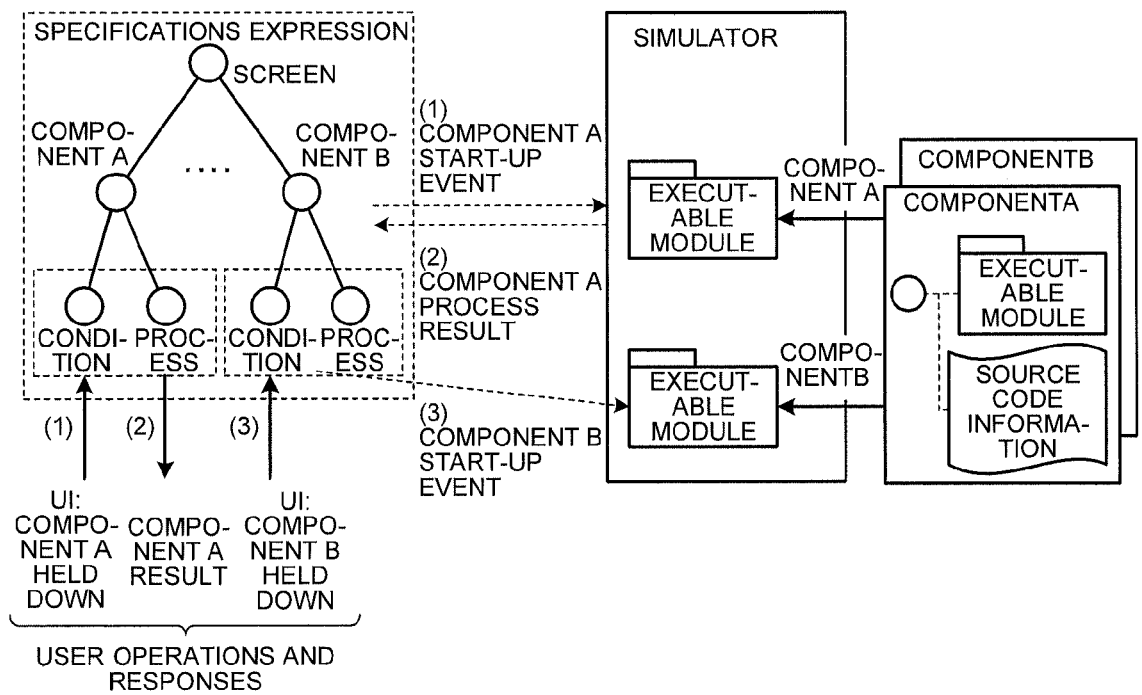
FIG. 21 is a diagram illustrating an example of a simulation execution process.

With reference to FIG. 21, a simulation execution process will be explained. FIG. 21 is a diagram for explaining a simulation execution process. When a UI component A is held down by a user operation (see (1) in FIG. 21), the simulator is notified of a component A start-up event and an executable module of the simulator executes an operation in accordance with the description of a UI action definition and then outputs a processing result of the component A (see (2) in FIG. 21). Similarly, when a UI component B is held down by a user operation (see (3) in FIG. 21), the simulator is notified of a component B start-up event and an executable module of the simulator executes an operation in accordance with the description of the UI action definition.

The verifier module 13c displays an operation screen of a user interface, extracts a feature amount of an operation screen from the operation screen of the user interface, and verifies whether the feature amount satisfies given criteria based on the information relevant to the attributes of components. Specifically, the verifier module 13c carries out criteria satisfaction verification concerning the UI operation. The verifier module 13c stores therein indices (metrics) relevant to screens (see later-described FIG. 23) as a scheme for viewability of components and for preventing false recognition and erroneous operation in terms of screen operation. The criteria satisfaction verification concerning the UI operation is the verification that uses a technique to extract characteristics of the screen concerning a UI operation as quantitatively as possible by measuring the indices so as to check whether the criteria to realize an efficient UI operation is satisfied.

The verifier module 13c carries out data conversion for the property of the component that displays information of character string type or integer type when displayed on a screen so that the wording in the linguistic expression portion can be displayed. More specifically, in the data structure of specification data, the information of linguistic expression, type, and restriction is given to the property of each component in the linguistic expression portion. Therefore, when displaying on the screen, for the property of component that displays information of character string type or integer type on the screen, the data is converted so that the wording in linguistic expression can be displayed. Then, as a verifier execution screen, the wording is displayed on the screen together with the component.

In FIG. 22, a verifier execution screen is exemplified. FIG. 22 is a diagram illustrating an example of a verifier execution screen. In the example in FIG. 22, the component #1 displays a "geographical list", and the sub-components #1 to #3 display the character strings of geographical names #1 to #3, respectively. The wordings displayed together with the components in this way makes it easier to determine what information is displayed and where on a screen it is displayed.

Thereafter, the verifier module 13c focuses on one of the metrics, extracts a feature amount from the relationship of all screens or between screens, and accumulates the feature amount for the one of the metrics. When the verifier module 13c verifies operation criteria on all the indices, the verifier module 13c outputs the feature amount. In FIG. 23, metrics for UI operation are exemplified. FIG. 23 is a chart illustrating an example of metrics for UI operation. As illustrated in FIG. 23, examples of metrics for UI operation include operability metrics and visibility metrics. For example, as the operability metrics, the number of screen changes to a desired screen, the type of a button, and disposition of the button are defined. As the visibility metrics, size and shape of a component, consistency in display, legibility of characters, and color combination are defined.

For example, the verifier module 13c extracts label components that have the wording of "geographical name" present in the linguistic expression and calculates their locations, thereby allowing the feature amount concerning the metrics of the legibility of characters to be measured automatically. The linguistic expression of each component is also used when describing a UI operation by action definition. This scheme makes it possible to pass on the UI specifications to an environment other than the present tool. Furthermore, a specification reviewer (person other than a software developer who has knowledge of software structure of UI operation) can review the UI specifications.

The test case generator 13d extracts restriction information from the specification data and generates test restriction information that is a test case. Specifically, the test case generator 13d checks all UI components present on all screens whether there are any properties accompanied with restriction information, and when a property accompanied with restriction information is present, extracts test restriction information of a test case. The test restriction information here means a condition given to each property of the UI components. For example, the information includes a condition of "must be equal to or larger than the display list top pointer and equal to or smaller than the display list end pointer" for the current display pointer, and a condition of "the number of characters restricted" for the label #1 display character string to the label #3 display character string.

When there is a sub-node present as in a combined component and there is a property present accompanied with restriction information for the sub-node, the test case generator 13d then extracts the restriction information as the test restriction information. In other words, each of the properties of the UI components is given conditions such as attributes of property values and an available range of property values, and the test case generator 13d extracts these conditions for all UI components on each of the screens and tallies them as restriction information check items for test.

Figures 24, 25:
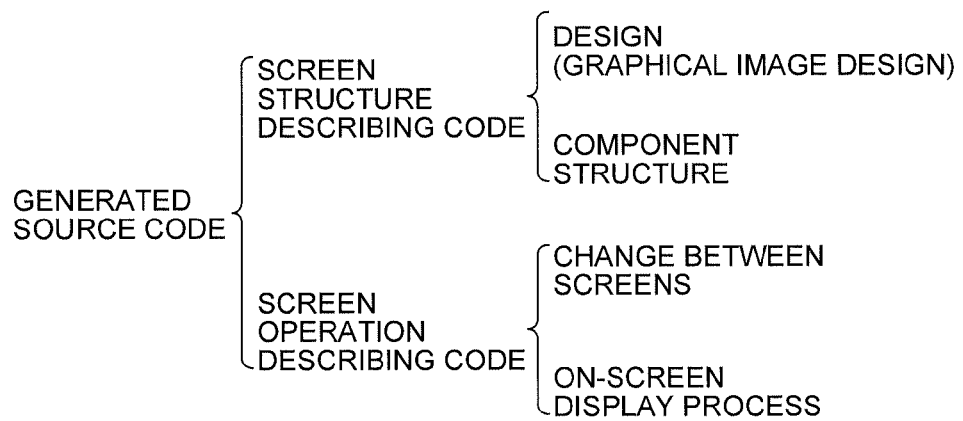
FIG. 24 is a chart illustrating an example of test restriction information.
FIG. 25 is a diagram illustrating a structure of a source code.

An example of test restriction information is illustrated in FIG. 24. FIG. 24 is a chart illustrating an example of test restriction information. In the example in FIG. 24, "equal to or larger than the top pointer and equal to or smaller than the end pointer" is described as the restriction content for the "current display pointer" property of the list display component on the screen A. Accordingly, by generating and storing a test case, in the software development process at a later stage of the UI specification process, a software developer can refer to the test case serving as a reference. This is because the software developer is not necessarily well acquainted with the specifications.

The source code generator 13e generates a source code using the information relevant to activating conditions of components, the information concerning content of process operations of the components, and the information relating to attributes of the components. Specifically, the source code generator 13e first extracts and encodes the specification information concerning the design (graphical image design) of screen components from the properties of all UI components present on all screens. When action definitions for the UI components are present, the source code generator 13e converts the specification information of the action definition into a source code. When a sub-node is present as in a combined component, the source code generator 13e then generates a code concerning the design (graphical image design) and a code concerning the action definition for the sub-node, and stores them in a source code storage module 14d.

The code generated in this way serves as the code to realize the functions indicated in FIG. 25. FIG. 25 is a diagram illustrating a structure of a source code. More specifically, as illustrated in FIG. 25, the code includes a "screen structure describing code" that specifies a component structure and design (graphical image design) of each screen and a "screen operation describing code" that describes display processes included in each screen and changes between screens. These source codes generate a source code for all the components present on a screen from specifications information specifying design (graphical image design) of the UI components themselves and control information specifying UI operations of the UI components.

The storage module 14 stores therein data and programs required for various processes performed by the controller 13, and includes the action defining format storage module 14a, the specification data storage module 14b, a test data storage module 14c, and the source code storage module 14d.

The action defining format storage module 14a stores therein action defining formats. For example, as illustrated in FIG. 15, the action defining format storage module 14a stores therein action defining formats by categories. The categories include activating conditions and process operations. Furthermore, the category of activating conditions includes an event, numerical value comparison, and character string comparison, while the category of process operations includes numerical value setting, character string setting, method execution, and screen change. For example, the action defining format storage module 14a stores therein an action defining format of "when an event of component is generated" for the category of the event in the activating conditions.

The specification data storage module 14b stores therein specification data. For example, as illustrated in FIG. 17, the specification data storage module 14b stores therein specification data in tree structure. In the example in FIG. 17, the screen A is defined as a top node and the component #1 and the component #2 that is a combined component are connected as lower nodes. The component #2 of the combined component is connected with the sub-components #1 to #5 as lower nodes. The specification data storage module 14b further stores therein activating conditions and process operations for the respective sub-components.

The test data storage module 14c stores therein test restriction information that is a test case generated by the test case generator 13d. For example, as illustrated in FIG. 24, the test data storage module 14c stores therein "equal to or larger than the top pointer and equal to or smaller than the end pointer" as restriction content of the "current display pointer" property of the list display component on the screen A.

The source code storage module 14d stores therein a source code generated by the source code generator 13e. For example, as illustrated in FIG. 25, the source code storage module 14d stores therein a "screen structure describing code" specifying a component structure and design (graphical image design) of a screen and a "screen operation describing code" describing display processes included in each screen and changes between screens.

[Process by UI Specification Creating Apparatus]

Figure 26:
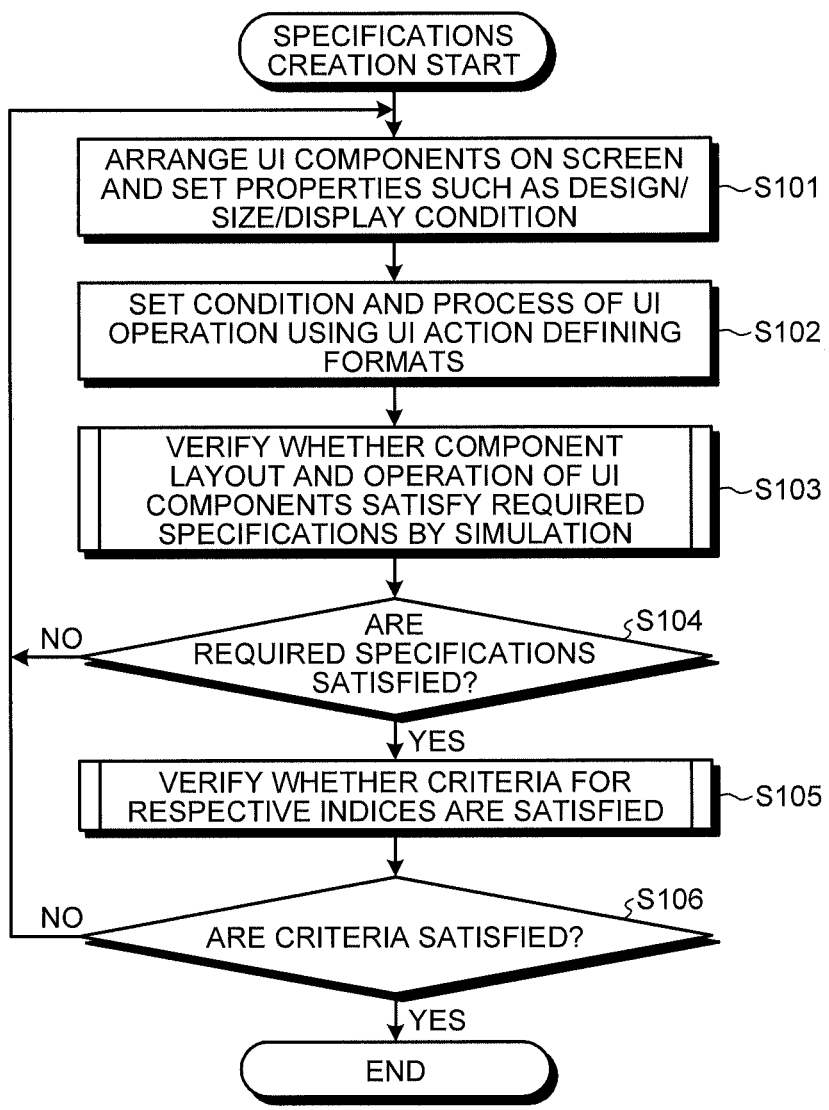
FIG. 26 is a flowchart for explaining a processing procedure of the UI specification creating apparatus according to the embodiment.
Figure 27:
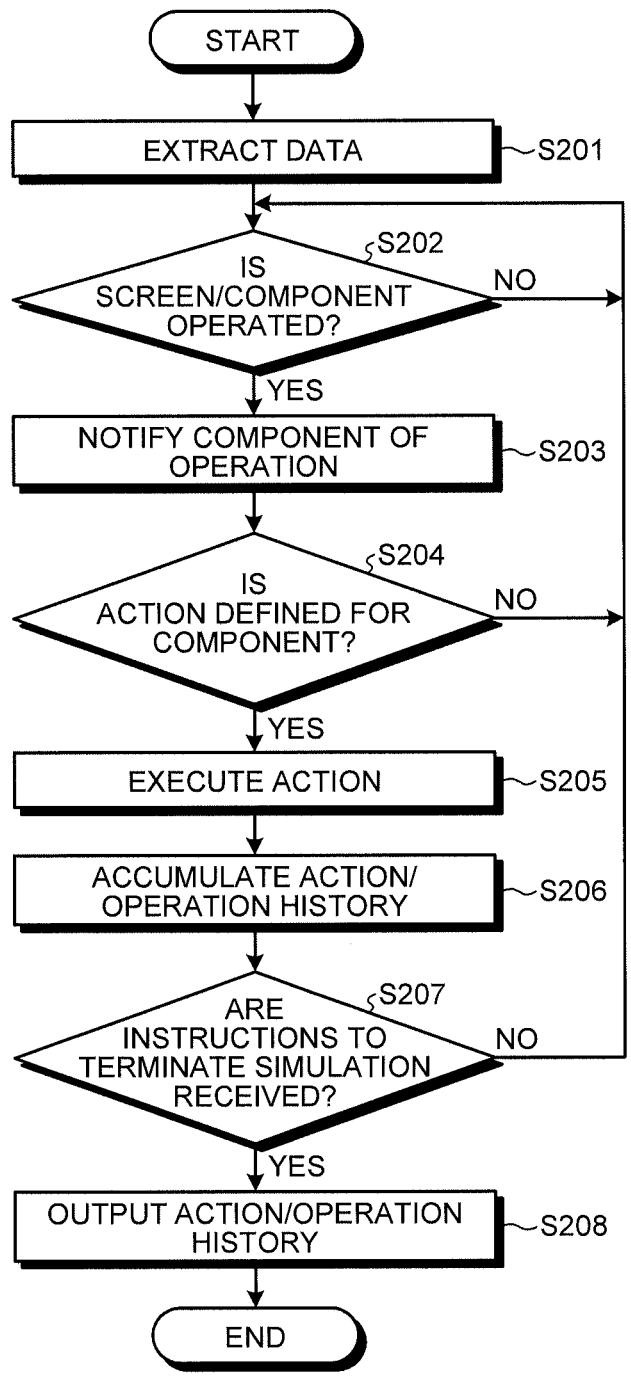
FIG. 27 is a flowchart for explaining a processing procedure of a function verifying process of the UI specification creating apparatus according to the embodiment.
Figure 28:
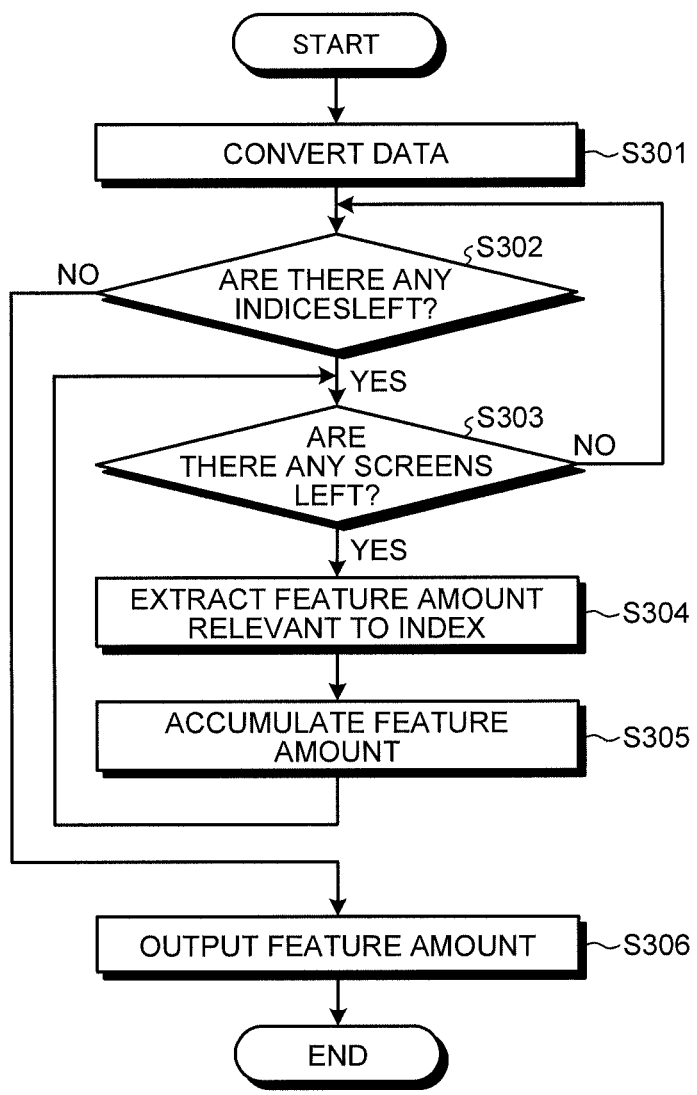
FIG. 28 is a flowchart for explaining a processing procedure of an operation criteria verifying process of the UI specification creating apparatus according to the embodiment.
Figure 29:
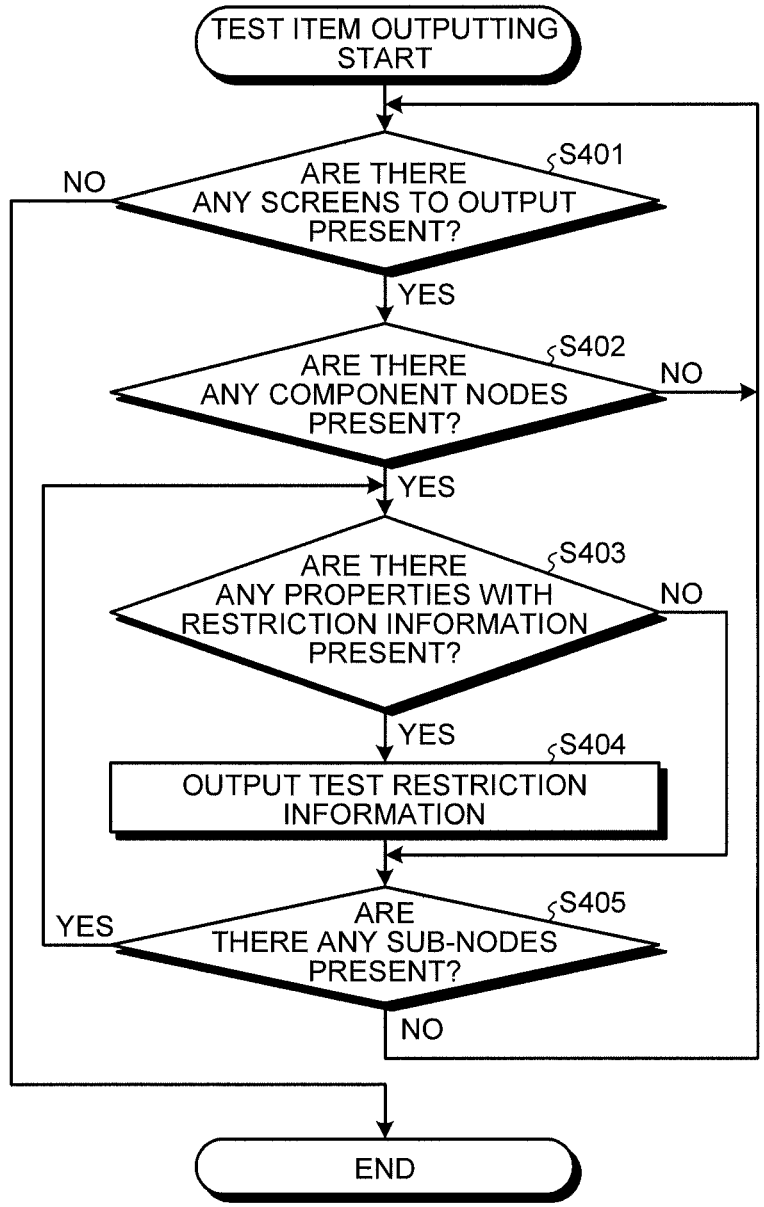
FIG. 29 is a flowchart for explaining a processing procedure of a test item outputting process of the UI specification creating apparatus according to the embodiment.
Figure 30:
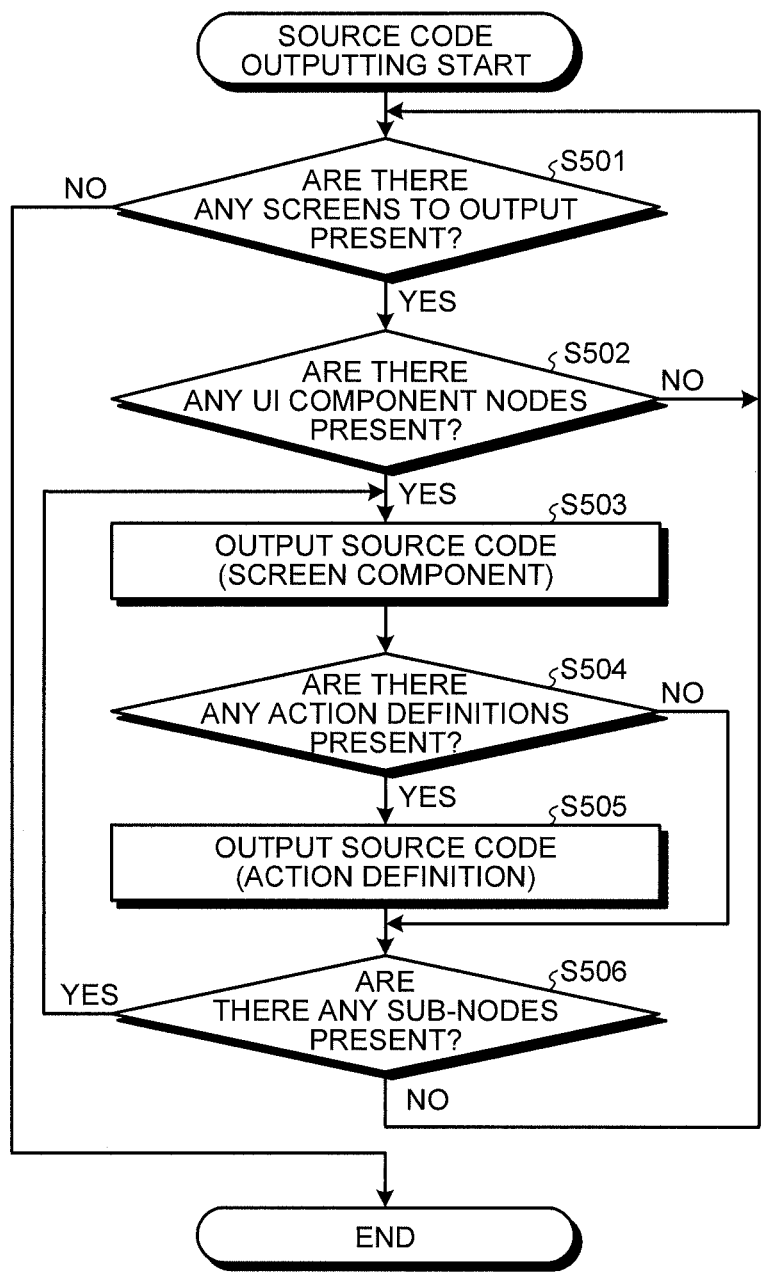
FIG. 30 is a flowchart for explaining a processing procedure of a source code outputting process of the UI specification creating apparatus according to the embodiment.

With reference to FIGS. 26 to 30, the processes performed by the UI specification creating apparatus 10 according to the embodiment will be described. FIG. 26 is a flowchart for explaining a processing procedure of the UI specification creating apparatus according to the embodiment. FIG. 27 is a flowchart for explaining a processing procedure of a function verifying process of the UI specification creating apparatus according to the embodiment. FIG. 28 is a flowchart for explaining a processing procedure of an operation criteria verifying process of the UI specification creating apparatus according to the embodiment. FIG. 29 is a flowchart for explaining a processing procedure of a test item outputting process of the UI specification creating apparatus according to the embodiment. FIG. 30 is a flowchart for explaining a processing procedure of a source code outputting process of the UI specification creating apparatus according to the embodiment.

As illustrated in FIG. 26, the UI specification creating apparatus 10 receives the selection of UI components displayed on a screen, the arrangement thereof on the screen, and the settings for size, shape, colors (normal color, held-down color), display condition, and such thereof (step S101). The UI specification creating apparatus 10 then sets a start-up event, an activating condition, and a process operation of UI action definition using action defining formats for each of the UI components (step S102). The UI specification creating apparatus 10 then verifies, after the operations for all UI components and functional components are set, whether component layouts and the operations of UI components set satisfy the specifications by a simulator (step S103).

As a result, when the specifications are not satisfied (No at step S104), the UI specification creating apparatus 10 returns to step S101 and receives settings for UI components again. When the specifications are satisfied (Yes at step S104), the UI specification creating apparatus 10 verifies whether criteria for respective metrics are satisfied (step S105). Accordingly, when the criteria are not satisfied (No at step S106), the UI specification creating apparatus 10 returns to step S101 and receives settings for UI components again. In contrast, when the criteria are satisfied (Yes at step S106), the UI specification creating apparatus 10 terminates the process.

With reference to FIG. 27, the function verifying process of the UI specification creating apparatus will be explained. As illustrated in FIG. 27, the UI specification creating apparatus 10 scans the specification data from the top node and extracts the component set with an event (step S201). The UI specification creating apparatus 10 then determines whether a screen or a component is operated (step S202), and when a screen or a component is operated (Yes at step S202), the UI specification creating apparatus 10 notifies the UI component of the UI operation (step S203) and determines whether an action is defined for the component (step S204).

When an action is not defined for the component (No at step S204), the UI specification creating apparatus 10 returns to step S202 and waits for a screen or a component to be operated. When an action is defined for the component (Yes at step S204), the UI specification creating apparatus 10 executes the action using an executable module accompanied with the UI component (step S205) and accumulates the history of actions and operations (step S206).

The UI specification creating apparatus 10 then determines whether instructions to terminate the simulation are received (step S207), and when simulation terminate instructions are received (Yes at step S207), the UI specification creating apparatus 10 outputs the history of actions and operations (step S208). When simulation finish instructions are not received (No at step S207), the UI specification creating apparatus 10 returns to step S202 and waits for a screen or a component to be operated. Thereafter, the user analyzes the history delivered and checks whether the requirement is satisfied.

With reference to FIG. 28, the operation criteria verifying process of the UI specification creating apparatus will be explained. As illustrated in FIG. 28, the UI specification creating apparatus 10 carries out data conversion for the properties of components whose information is to be displayed on a screen in character string type or integer number type when displaying on the screen so that the wording in the linguistic expression portion can be displayed (step S301). The UI specification creating apparatus 10 then determines whether there are any indices left for which the verification of operation criteria is not yet performed (step S302), and when there are any indices left (Yes at step S302), the UI specification creating apparatus 10 focuses on one of the indices and determines whether there are any screens left for which the verification of operation criteria is not yet performed (step S303).

As a result, when there are some screens left for which the verification of operation criteria is not yet performed (Yes at step S303), the UI specification creating apparatus 10 extracts a feature amount of a screen from the relationship of all screens or between screens for the one of the indices (step S304), and accumulates the feature amount (step S305). On the other hand, at step S303, when there is no screen left for which the verification of operation criteria is not yet performed (No at step S303), the UI specification creating apparatus 10 returns to step S302 and determines whether there are any indices left for which the verification of operation criteria is not yet performed. Consequently, when there is no index left for which the verification of operation criteria is not yet performed (No at step S320), the UI specification creating apparatus 10 outputs the feature amount (step S306) and terminates the process.

With reference to FIG. 29, an outputting process of test restriction information will be explained. As illustrated in FIG. 29, the UI specification creating apparatus 10 determines whether there are any screens to be output present which is output as a UI operation screen (step S401), and when there is no screen present (No at step S401), the UI specification creating apparatus 10 terminates the process. In contrast, when there are some screens left to be output (Yes at step S401), the UI specification creating apparatus 10 determines whether there are any component nodes present (step S402). As a result, when there is no component node present (No at step S401), the UI specification creating apparatus 10 returns to step S401. When component nodes are present (Yes at step S402), the UI specification creating apparatus 10 determines whether there are any properties accompanied with restriction information (step S403). When properties accompanied with the restriction information are present (Yes at step S403), the UI specification creating apparatus 10 outputs test restriction information (step S404).

Thereafter, the UI specification creating apparatus 10 determines whether there are any sub-nodes present (step S405). When some sub-nodes are present (Yes at step S405), the UI specification creating apparatus 10 returns to step S403 and, for the sub-nodes, extracts the restriction information as test restriction information when there are some properties accompanied with restriction information present. When there is no sub-node present (No at step S405), the UI specification creating apparatus 10 returns to step S401 and determines whether there are any screens to be output present for which outputting a test item is not yet performed. At step S401, when there is no screen to be output present (No at step S401), the UI specification creating apparatus 10 terminates the process.

With reference to FIG. 30, the source code outputting process will be explained. As illustrated in FIG. 30, the UI specification creating apparatus 10 determines whether there are any screens to be output present (step S501). As a result, when there is a screen to be output present (Yes at step S501), the UI specification creating apparatus 10 determines whether there are any UI component nodes present (step S502), and when there is no UI component node present (No at step S502), the UI specification creating apparatus 10 returns to step S501. When there is a UI component node present (Yes at step S502), the UI specification creating apparatus 10 extracts specification data relevant to the design (graphical image design) of a screen component from the property and encodes the specification data to output a source code (step S503).

The UI specification creating apparatus 10 then determines whether there are any action definitions (step S504), and when there is an action definition present (Yes at step S504), the UI specification creating apparatus 10 carries out data conversion of specification information of the action definition to output a source code (step S505). Thereafter, the UI specification creating apparatus 10 determines whether there are any sub-nodes present (step S506), and when there is a sub-node present (Yes at step S506), the UI specification creating apparatus 10 returns to step S503 and generates a code concerning design (graphical image design) and a code concerning the action definition for the sub-node. When there is no sub-node present (No at step S506), the UI specification creating apparatus 10 returns to step S501. At step S501, when there is no screen present for which outputting a source code is not yet performed (No at step S501), the UI specification creating apparatus 10 terminates the process.

Effects of Embodiment

As described in the foregoing, the UI specification creating apparatus 10 displays formats that allow information relevant to activating conditions of components displayed on an operation screen of the UI and information concerning process operations of the components to be described in a given form and receives descriptions concerning specifications of the components based on the formats. The UI specification creating apparatus 10 then, based on the information relevant to the activating conditions of the components and the information concerning the content of process operations of the components received, displays operation screens of the user interface and carries out a simulation of actions for the components displayed on the operation screens of the user interface. As a consequence, a specification creator can carry out the verification of UI components while modifying the specifications of the components, whereby the development of the UI can be carried out promptly.

In accordance with the embodiment, a format that allows the information concerning attributes of components displayed on an operation screen of a user interface to be described in a given form is displayed, and the information concerning the attributes of the components is received based on the format. Based on the information concerning the attributes of the components received, the operation screen of the user interface is displayed, a feature amount concerning operability and visibility is extracted from the operation screen of the user interface, and the feature amount is output. Accordingly, the developer can understand the feature amount on operability and visibility of the screens relevant to the UI operations and thus can verify whether the criteria to realize UI operations are satisfied. Consequently, it is possible to create operation screens of the user interface so as to facilitate viewing in terms of operating the screens and to avoid an erroneous operation.

In accordance with the embodiment, the UI specification creating apparatus 10 displays formats that allow description in a given form and receives information relevant to activating conditions of components displayed on operation screens of a UI, information concerning content of processes that the components operate, and information relevant to attributes of the components. The UI specification creating apparatus 10 then generates a source code using the information relevant to activating conditions of the components displayed on operation screens of the UI, the information concerning the content of processes that the components operate, and the information relevant to the attributes of the components. Accordingly, the source code can be generated directly from the specification data that has been confirmed normal in operation, whereby errors and omissions in coding can be reduced.

In accordance with the embodiment, the UI specification creating apparatus 10 displays formats that allow the information relevant to the attributes of the components displayed on operation screens of the UI to be described in a given form, and receives the information relevant to the attributes of the components based on the formats and conditional information given to the information relevant to the attributes. The UI specification creating apparatus 10 then extracts the conditional information given to the information relevant to the attributes received, and outputs the conditional information. Consequently, in the software development process of a later stage of the UI specification process, it is possible for a software developer to refer to the conditional information for reference.

While the embodiment of the present invention has been exemplified in the foregoing, the invention may be implemented in various different embodiments other than the above-described embodiment. In the followings, the other embodiments that the invention includes will be described.

(1) System Configuration and such

Each of the constituent elements of each module illustrated in the drawings is functionally conceptual and is not necessarily configured physically as illustrated in the drawings. In other words, the specific embodiments of distribution or integration of the respective modules are not restricted to those illustrated, and the whole or a part thereof can be configured by being functionally or physically distributed or integrated in any unit according to various types of loads and usage. For example, the specification description edit module 13a and the verifying module 13b may be integrated. Furthermore, the whole or a part of the processing functions carried out in the respective modules can be realized by a CPU and a computer program analyzed and executed by the CPU or can be realized by a wired logic as hardware.

(2) Computer Program

Figure 31:
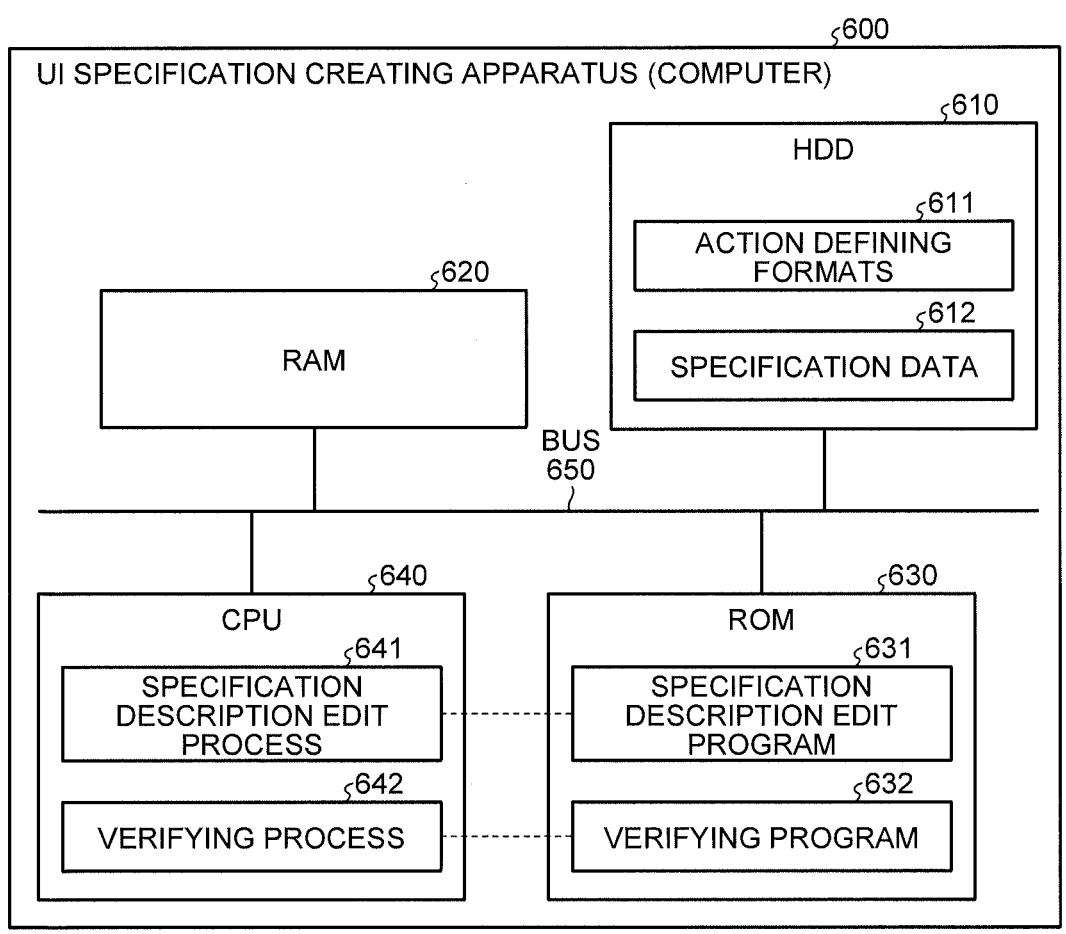
FIG. 31 is a block diagram illustrating an example of a computer that executes a UI design supporting program.

The various processes explained in the above-described embodiment can be realized by a computer executing a computer program prepared in advance. Accordingly, in the followings, with reference to FIG. 31, an example of a computer that executes a computer program having the same functions as those of the embodiment above will be explained. FIG. 31 is a block diagram illustrating an example of a computer that executes a UI design supporting program.

As illustrated in FIG. 31, a computer 600 as a UI specification creating apparatus is constructed with an HDD 610, a RAM 620, a ROM 630, and a CPU 640 being connected with one another via a bus 650.

The ROM 630 stores therein in advance the UI design supporting program that exercises the same functions as those of the above-described embodiment, more specifically, as illustrated in FIG. 31, a specification description edit program 631 and a verifying program 632. The programs 631 and 632 may, similarly to each of the constituent elements of the UI specification creating apparatus illustrated in FIG. 1, appropriately be integrated or distributed.

The CPU 640 then reads out these programs 631 and 632 from the ROM 630 and executes them, whereby the programs 631 and 632 function as a specification description edit process 641 and a verifying process 642, respectively.

The HDD 610 stores therein, as illustrated in FIG. 31, action defining formats 611 and specification data 612. The CPU 640 reads out the action defining formats 611 and the specification data 612 and stores them in the RAM 620, and then executes processes based on the action defining formats 611 and the specification data 612 stored in the RAM 620.

The development of a UI can be carried out promptly.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium storing an operation screen design supporting program causing a computer to perform:
   displaying a format that allows information relevant to a condition of an element displayed on an operation screen to be activated and information concerning content of process that the element operates to be described in a given form, and receiving the information relevant to the condition of the element to be activated and the information concerning the content of process that the element operates based on the format; and
   displaying an operation screen based on the information relevant to the condition of the element to be activated and the information concerning the content of process that the element operates received, and carrying out a simulation of operation of the element displayed on the operation screen.

2. The non-transitory computer-readable storage medium according to claim 1, the operation screen design supporting program further causing the computer to perform:
   displaying a format that allows information relevant to attributes of an element displayed on the operation screen to be described in a given form, and receiving the information relevant to the attributes of the element based on the format; and
   displaying an operation screen, extracting a feature amount concerning operability and visibility from the operation screen, and outputting the feature amount, based on the information relevant to the attributes of the element received.

3. The non-transitory computer-readable storage medium according to claim 1, the operation screen design supporting program further causing the computer to perform:
   displaying a format that allows information relevant to a condition of an element displayed on the operation screen to be activated, information concerning content of process that the element operates, and information relevant to attributes of the element to be described in a given form, and receiving the information relevant to the condition of the element to be activated, the information concerning the content of process that the element operates, and the information relevant to the attributes of the element based on the format; and
   generating a source code using the information relevant to the condition of the element to be activated, the information concerning the content of process that the element operates, and the information relevant to the attributes of the element received.

4. The non-transitory computer-readable storage medium according to claim 1, the operation screen design supporting program further causing the computer to perform:
   displaying a format that allows information relevant to attributes of an element displayed on the operation screen to be described in a given form, and receiving the information relevant to the attributes of the element and conditional information given to the information relevant to the attributes based on the format; and
   extracting the conditional information given to the information relevant to the attributes received, and outputting the conditional information.

5. An operation screen design supporting apparatus comprising:
   a receiving module that displays a format that allows information relevant to a condition of an element displayed on an operation screen to be activated and information concerning content of process that the element operates to be described in a given form and receives the information relevant to the condition of the element to be activated and the information concerning the content of process that the element operates based on the format; and a verifying module that displays an operation screen and carries out a simulation of an operation of the element displayed on the operation screen, based on the information relevant to the condition of the element to be activated and the information concerning the content of process that the element operates received.

6. An operation screen design supporting method for supporting design of an operation screen, the operation screen design supporting method comprising:

displaying a format that allows information relevant to a condition of an element displayed on the operation screen to be activated and information concerning content of process that the element operates to be described in a given form, and receiving the information relevant to the condition of the element to be activated and the information concerning the content of process that the element operates based on the format; and displaying the operation screen, and carrying out a simulation of an operation of the element displayed on the operation screen, based on the information relevant to the condition of the element to be activated and the information concerning the content of process that the element operates received.

7. An operation screen design supporting apparatus comprising:

a processor that executes a process including:

displaying a format that allows information relevant to a condition of an element displayed on an operation screen to be activated and information concerning content of process that the element operates to be described in a given form and receives the information relevant to the condition of the element to be activated and the information concerning the content of process that the element operates based on the format; and displaying an operation screen and carries out a simulation of an operation of the element displayed on the operation screen, based on the information relevant to the condition of the element to be activated and the information concerning the content of process that the element operates received.

* * * * *